United States Patent
Kim et al.

(10) Patent No.: US 12,089,320 B2
(45) Date of Patent: *Sep. 10, 2024

(54) INDUCTION HEATING DEVICE HAVING IMPROVED ASSEMBLABILITY AND COOLING PERFORMANCE

(71) Applicant: LG Electronics Inc., Seoul (KR)

(72) Inventors: Seongjun Kim, Seoul (KR); Yongsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 620 days.

This patent is subject to a terminal disclaimer.

(21) Appl. No.: 16/838,229

(22) Filed: Apr. 2, 2020

(65) Prior Publication Data
US 2020/0359469 A1    Nov. 12, 2020

(30) Foreign Application Priority Data

May 7, 2019    (KR) .......................... 10-2019-0053333

(51) Int. Cl.
*H05B 6/12*    (2006.01)
*F24C 15/00*    (2006.01)
(Continued)

(52) U.S. Cl.
CPC .......... *H05B 6/1209* (2013.01); *F24C 15/006* (2013.01); *H02M 1/44* (2013.01);
(Continued)

(58) Field of Classification Search
CPC ...... H05B 6/12; H05B 6/1218; H05B 6/1209; H05B 6/36; H05B 6/062; H05B 3/76;
(Continued)

(56) References Cited

U.S. PATENT DOCUMENTS

| 8,440,944 | B2 * | 5/2013 | Acero Acero | ....... | H05B 6/1254 |
| | | | | | 219/620 |
| 9,565,721 | B2 * | 2/2017 | Okada | ..................... | H05B 6/062 |
| 10,805,989 | B2 * | 10/2020 | Kim | ..................... | H05B 6/1236 |
| 10,856,369 | B2 * | 12/2020 | Kim | ..................... | H05B 6/1218 |
| 10,980,156 | B2 * | 4/2021 | Kim | ......................... | H05K 7/207 |
| 11,140,752 | B2 * | 10/2021 | Choi | ...................... | H05B 6/065 |

(Continued)

FOREIGN PATENT DOCUMENTS

| DE | 112013004163 | 5/2015 |
| EP | 3651549 | 5/2020 |

(Continued)

OTHER PUBLICATIONS

Machine English Translation of JP-5948612-B2 (Year: 2016).*
Extended European Search Report in European Appln. No. 20171275.9, dated Oct. 2, 2020, 8 pages.

*Primary Examiner* — Helena Kosanovic
*Assistant Examiner* — Erwin J Wunderlich
(74) *Attorney, Agent, or Firm* — Fish & Richardson P.C.

(57) ABSTRACT

An induction heating device includes a case, a working coil, a base plate that is disposed vertically below the working coil, an indicator substrate support that is coupled to the case and that is disposed vertically below the base plate, an indicator substrate that is disposed on an upper surface of the indicator substrate support, that is disposed vertically below the base plate, and that is spaced apart from the base plate, an inverter substrate that is disposed at a lower surface of the indicator substrate support and that includes an inverter configured to apply a resonance current to the working coil through a switching operation, and a resonance substrate that is disposed at the lower surface of the indicator substrate support, that is connected to the working coil, and that includes a resonance capacitor configured to generate the resonance current based on the switching operation of the inverter.

19 Claims, 17 Drawing Sheets

(51) Int. Cl.
*H02M 1/44* (2007.01)
*H05B 6/04* (2006.01)
*H05B 6/06* (2006.01)
*H05B 6/36* (2006.01)

(52) U.S. Cl.
CPC .............. *H05B 6/04* (2013.01); *H05B 6/062* (2013.01); *H05B 6/1218* (2013.01); *H05B 6/1245* (2013.01); *H05B 6/1254* (2013.01); *H05B 6/1263* (2013.01); *H05B 6/1272* (2013.01); *H05B 6/365* (2013.01); *H05B 2206/022* (2013.01); *H05B 2213/07* (2013.01)

(58) Field of Classification Search
CPC .......... H05B 2213/07; H05B 2206/022; H05B 6/1263; H05B 6/1254; H05B 6/04; H05B 6/1245; H05B 6/1272; H05B 6/365; F24C 15/10; F24C 15/006; H02M 1/44
USPC ..... 219/620, 601, 647, 622, 624, 446.1, 621
See application file for complete search history.

(56) References Cited

U.S. PATENT DOCUMENTS

| | | | | |
|---|---|---|---|---|
| 11,140,753 | B2 * | 10/2021 | Kim | H05B 6/1218 |
| 11,178,731 | B2 * | 11/2021 | Kim | H05B 6/362 |
| 2007/0278215 | A1 * | 12/2007 | Schilling | H05B 6/1263 |
| | | | | 219/622 |
| 2010/0219179 | A1 * | 9/2010 | Lin | F24C 15/101 |
| | | | | 165/104.31 |
| 2018/0168005 | A1 * | 6/2018 | Yun | H05B 6/065 |
| 2019/0297681 | A1 * | 9/2019 | Parachini | H05B 6/065 |
| 2019/0297686 | A1 * | 9/2019 | Parachini | H05B 6/1272 |
| 2020/0154530 | A1 | 5/2020 | Kim et al. | |
| 2020/0154532 | A1 | 5/2020 | Kim et al. | |
| 2021/0112637 | A1 * | 4/2021 | Becke | H05B 6/1218 |

FOREIGN PATENT DOCUMENTS

| | | |
|---|---|---|
| EP | 3651551 | 5/2020 |
| JP | 5948612 B2 * | 7/2016 |
| JP | 6052585 | 12/2016 |
| WO | WO2019011586 | 1/2019 |

* cited by examiner

PRIOR ART

PRIOR ART

PRIOR ART

PRIOR ART

INDUCTION HEATING DEVICE HAVING IMPROVED ASSEMBLABILITY AND COOLING PERFORMANCE

CROSS-REFERENCE TO RELATED APPLICATION

The present disclosure claims priority to and the benefit of Korean Patent Application No. 10-2019-0053333, filed on May 7, 2019, the disclosure of which is incorporated herein by reference in its entirety.

TECHNICAL FIELD

The present disclosure relates to an induction heating device with improved assemblability and cooling performance.

BACKGROUND

Various types of cooking apparatuses may be used to heat food in homes and restaurants. For example, gas ranges use gas as fuel to heat food. In some examples, cooking devices may heat an object such as a cooking vessel, for example, a pot, with electricity instead of gas.

A method of heating an object via electricity may be classified into a resistive heating method and an induction heating method. In the electrical resistive method, heat may be generated based on current flowing through a metal resistance wire or a non-metallic heating element, such as silicon carbide, and the heat may be transmitted to the object (e.g., the cooking vessel) through radiation or conduction, to heat the object. In the induction heating method, eddy current may be generated in the object made of metal based on a magnetic field generated, around the coil, based on a high-frequency power having a predetermined magnitude applied to the coil to heat the object.

In some examples, where an induction heating device use an induction heating method, the induction heating device may include working coils configured to heat a plurality of objects (e.g., cooking vessels), respectively.

In some cases, an induction heating device (e.g., a zone-free type induction heating device) may simultaneously heats one object with a plurality of working coils.

In some cases, a zone-free type induction heating device may inductively heat an object regardless of the size and position of the object in the region where the plurality of working coils are present.

In some cases of the zone-free type induction heating device, an assembly process may be complicated due to presence of a plurality of working coils and may affect cooling performance of the zone-free type induction heating device.

FIGS. 1 to 4 show methods of assembling working coil assemblies of an induction heating device in related art.

FIGS. 1 and 2 show one example method of assembling a working coil assembly in related art. FIGS. 3 and 4 show another example method of assembling a working coil assembly in related art.

Referring to FIG. 1 and FIG. 2, in some cases, where a zone-free type induction heating device is manufactured, an operator, which includes a person who works in a manufacturing line or a manufacturing machine, may fasten a plurality of working coils assemblies WCAs including working coils, ferrite cores, and mica sheets to a substrate 11 (e.g., a substrate on which an inverter or a resonance capacitor is mounted).

For instance, the indicator substrate support may be fastened to the case 10, and the substrate 11 may be fastened to the indicator substrate support. In some cases, a plurality of working coil assemblies WCAs may be grouped and seated on an aluminum bar 12, and each of the plurality of working coil assemblies WCAs seated on the aluminum bar 12 may be individually fastened to the substrate 11.

The common terminal and the individual terminal of the working coils provided in each of the plurality of working coil assemblies WCA may be tied together, and the tied common terminal and individual terminal may be fastened to the substrate 11. For instance, as shown in FIG. 1, in some cases, where a terminal of the working coil is fastened, the operator may lift the aluminum bar 12 to fasten terminals of each of a plurality of working coils to the substrate 11.

In some cases, components that seat the working coil assembly WCA may be not an integrated aluminum plate, but an elongated aluminum bar 12, and an air flow path may not be defined in the case 10 to reduce heat generated by the working coil.

Referring to FIGS. 3 and 4, in some related art, where an induction heating device including multi-coil is manufactured, an operator may fasten a plurality of working coil assemblies WCAs to a substrate 21 (e.g., a substrate on which the inverter or the resonance capacitor is mounted) through an opening OP defined in an aluminum plate 23 that seats the plurality of working coil assemblies WCAs.

For example, the substrate 21, a fan 22, and the like, may be fastened to the indicator substrate support, and an aluminum plate 23 may be disposed on the indicator substrate support and integrated with the indicator substrate support to cover the substrate 21 and the fan 22.

In some cases, the plurality of working coil assemblies WCAs and a controller 24 may be seated on the aluminum plate 23, and terminals of the plurality of working coil assemblies WCAs and a wire harness (i.e., a wire bundle) of the controller 24 may be fastened to the substrate 21 through the opening OP defined at a central area of the aluminum plate 23.

The method of assembling the working coil assembly may be sometimes difficult to be used for a zone-free type induction heating device.

For example, the zone-free type induction heating device may include a plurality of working coil assemblies that cover the area of the aluminum plate 23. In some cases, it may be difficult to define a large-sized opening or a plurality of openings in the aluminum plate 23.

In some cases, as shown in FIG. 4, where the opening OP is defined in the aluminum plate 23 that seats the working coil assembly WCA, air flow may be generated to reduce heat generated by the working coil and blown to an outside through the opening OP. In some cases, it may be difficult to define an air flow path inside the case.

SUMMARY

The present disclosure describes an induction heating device having improved assemblability.

The present disclosure also describes an induction heating device having improved cooling performance.

The objects of the present disclosure are not limited to the above-mentioned objects, and other objects and advantages of the present disclosure which are not mentioned can be understood by the following description and more clearly understood by the implementations of the present disclosure. It will also be readily apparent that the objects and advantages of the present disclosure may be implemented by means described in claims and a combination thereof.

According to one aspect of the subject matter described in this application, an induction heating device includes a case, a working coil that is disposed inside the case and that includes a conducting wire that is annularly wound, a base plate that is disposed vertically below the working coil and that has an upper surface that supports the working coil, an indicator substrate support that is coupled to the case and that is disposed vertically below the base plate, an indicator substrate that is disposed on an upper surface of the indicator substrate support, that is disposed vertically below the base plate, and that is spaced apart from the base plate, an inverter substrate that is disposed at a lower surface of the indicator substrate support and that includes an inverter configured to apply a resonance current to the working coil through a switching operation, and a resonance substrate that is disposed at the lower surface of the indicator substrate support, that is connected to the working coil, and that includes a resonance capacitor configured to generate the resonance current based on the switching operation of the inverter.

Implementations according to this aspect may include one or more of the following features. For example, the base plate may define a plate hole at a position corresponding to an annular inner side of the working coil, the indicator substrate may define a substrate hole at a position corresponding to the plate hole, and the indicator substrate support may define a support hole at a position corresponding to the substrate hole. The plate hole, the substrate hole, and the support hole may be arranged along a height direction of the case. The indicator substrate may include a connector that protrudes upward from an upper surface of the indicator substrate, and the indicator substrate support may include a boss that protrudes downward from the lower surface of the indicator substrate support.

In some examples, the connector may be connected to the inverter, and the working coil may include a common terminal connected to the connector and an individual terminal that is connected to the resonance capacitor through the plate hole, the substrate hole, and the support hole.

In some implementations, the induction heating device may further include an electro-magnetic interference (EMI) filter that is disposed at the lower surface of the indicator substrate support, that is configured to receive alternating current (AC) power from a power supply, and that is configured to reduce noise of the AC power, and a switched mode power supply (SMPS) that is disposed at the lower surface of the indicator substrate support, that is configured to receive the AC power through the EMI filter, and that is configured to rectify the AC power to direct current (DC) power to provide the DC power to the inverter substrate. The boss may be coupled to at least one of a lower surface of the inverter substrate, a lower surface of the resonance substrate, a lower surface of the EMI filter, or a lower surface of the SMPS. The individual terminal of the working coil may be connected to the resonance capacitor through a space defined between the lower surface of the indicator substrate support and the at least one of the lower surface of the inverter substrate, the lower surface of the resonance substrate, the lower surface of the EMI filter, or the lower surface of the SMPS.

In some examples, the resonance substrate may be disposed at a central area of the lower surface of the indicator substrate support, the SMPS may be disposed at a first side of the resonance substrate, the EMI filter may be disposed at a front end of the SMPS, and the inverter substrate may be disposed at a rear end of the SMPS.

In some implementations, the indicator substrate support may be coupled to a lower surface of the base plate by a first plurality of screws, and the indicator substrate support and the base plate may be fixed to each other by the first plurality of screws, and are coupled to the case by a second plurality of screws.

In some implementations, the induction heating device may further include a ferrite core disposed vertically below the working coil and configured to direct upward an alternating magnetic field generated by the working coil, a first mica sheet disposed between the working coil and the ferrite core and configured to block heat transfer from the working coil to the ferrite core, a packing gasket that fixes the first mica sheet and the ferrite core to the base plate, and a sensor disposed at an upper end of the packing gasket and configured to detect a temperature of the packing gasket.

In some examples, the ferrite core may define a core hole at a center area of the ferrite core corresponding to an annular inner side of the working coil, the first mica sheet may define a first sheet hole at a center area of the first mica sheet corresponding to the annular inner side of the working coil, and the base plate may define a plate hole at a position corresponding to the annular inner side of the working coil. The core hole, the first sheet hole, and the plate hole may be arranged along a height direction of the case.

In some examples, shapes of the core hole, the first sheet hole, and the plate hole may be identical to one another, and the packing gasket may be inserted into the first sheet hole, the core hole, and the plate hole. An outer circumferential surface of the packing gasket has a cross-section corresponding to the shape of the first sheet hole.

In some examples, the first mica sheet may be fixed to the working coil and the ferrite core by a sealant. In some examples, the induction heating device may further include a second mica sheet fixed to an upper end of the working coil by a sealant.

In some implementations, the induction heating device may further include a first heat sink disposed at the inverter substrate and configured to dissipate heat generated by the inverter, and a second heat sink disposed at the resonance substrate and configured to dissipate heat generated by the resonance capacitor.

In some examples, the base plate may be made of aluminum (Al).

In some implementations, the induction heating device may further include a light guide disposed on the base plate and arranged around the working coil, the light guide comprising a light emitting surface configured to indicate whether the working coil is driven and an output intensity of the working coil, a light emitting element that is disposed on an upper surface of the indicator substrate, that is disposed vertically below the light guide, and that is configured to emit light to the light guide, and a blowing fan that is disposed at a lower surface of the base plate and that is configured to draw air from an outside of the case and to discharge the air into an air flow path defined between the base plate and the indicator substrate.

In some examples, the indicator substrate support may include an upper fence that is disposed on the upper surface of the indicator substrate support and that is arranged along an edge of the upper surface of the indicator substrate support, where the air flow path may be surrounded by the lower surface of the base plate, the upper surface of the indicator substrate, and the upper fence. In some examples, the blowing fan may be configured to decrease a temperature of the working coil and a temperature of the light emitting element by blowing the air through the air flow path.

In some implementations, the inverter substrate may have an upper surface that faces the lower surface of the indicator substrate support, and a lower surface that faces a bottom surface of the case and that supports the inverter. In some examples, the resonance substrate may have an upper surface that faces the lower surface of the indicator substrate support, and a lower surface that faces the bottom surface of the case and that supports the resonance capacitor.

In some implementations, the plate hole, the substrate hole, and the support hole may be coaxial with a center of the working coil.

In some examples, the inverter, the resonance capacitor, the EMI filter, and the SMPS may face a bottom surface of the case and protrude in a direction away from the lower surface of the indicator substrate support.

In some implementations, the induction heating device may reduce assembly burden and simplify a manufacturing process performed by the operator through improvement in the assemblability.

In some implementations, the induction heating device may protect components (e.g., working coils or light emitting elements) from damage by heat generation through improvement in cooling performance. In some implementations, durability may be improved and repair costs may be reduced by protecting the components from damage.

A specific effect of the present disclosure, further to the above-mentioned effect, is described below together while describing a specific matter for implementing the present disclosure.

DETAILED DESCRIPTION

Figure 1:
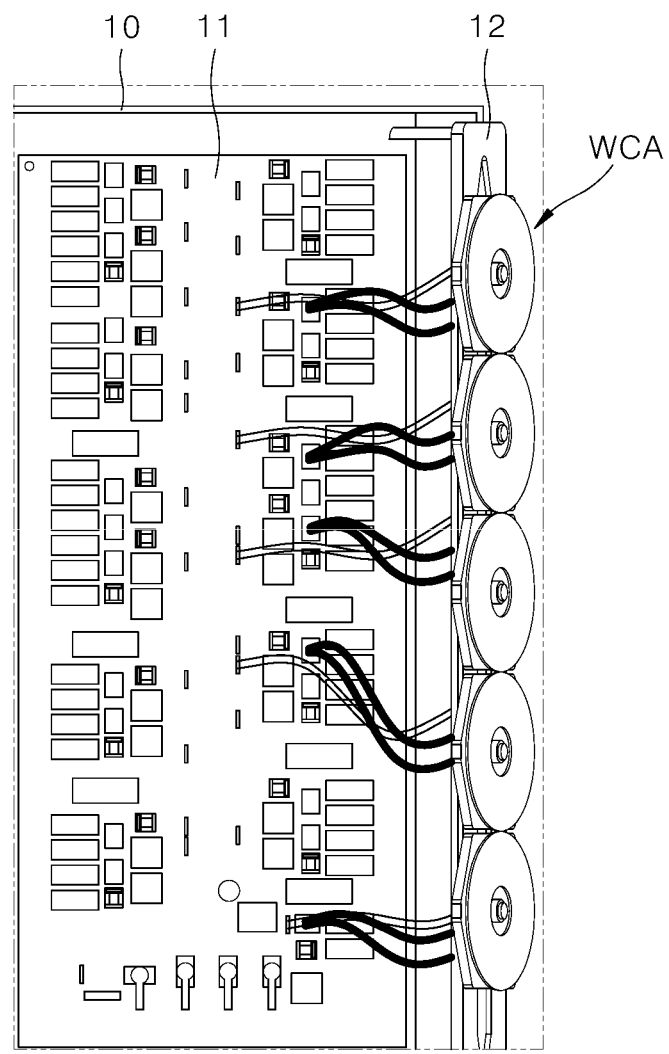
FIGS. 1 and 2 show a method of assembling a working coil assembly in related art.
Figure 2:
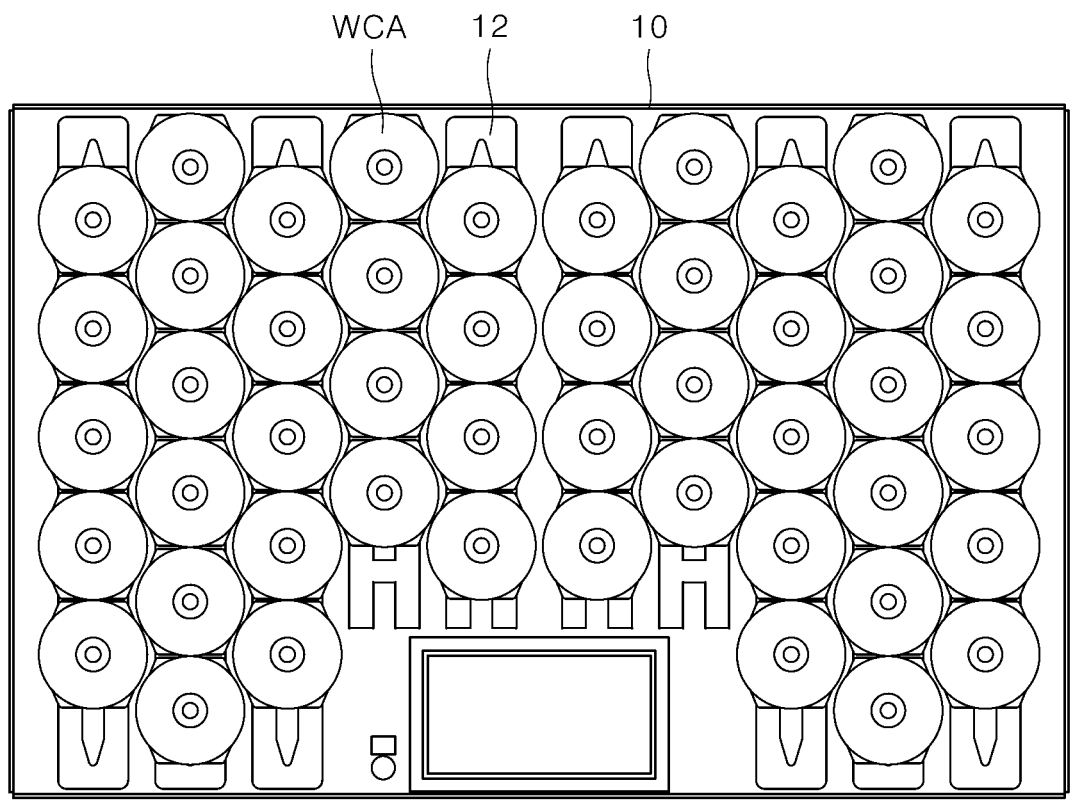
Figure 3:
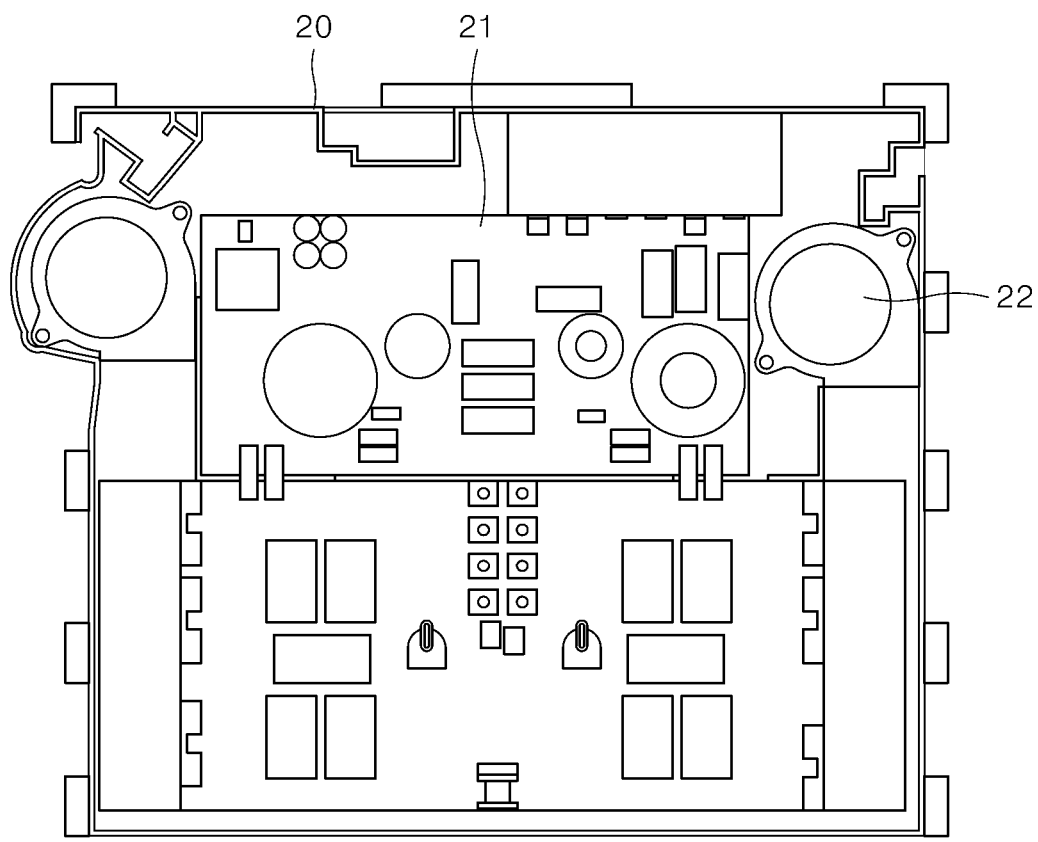
FIGS. 3 and 4 show another method of assembling a working coil assembly in related art.
Figure 4:
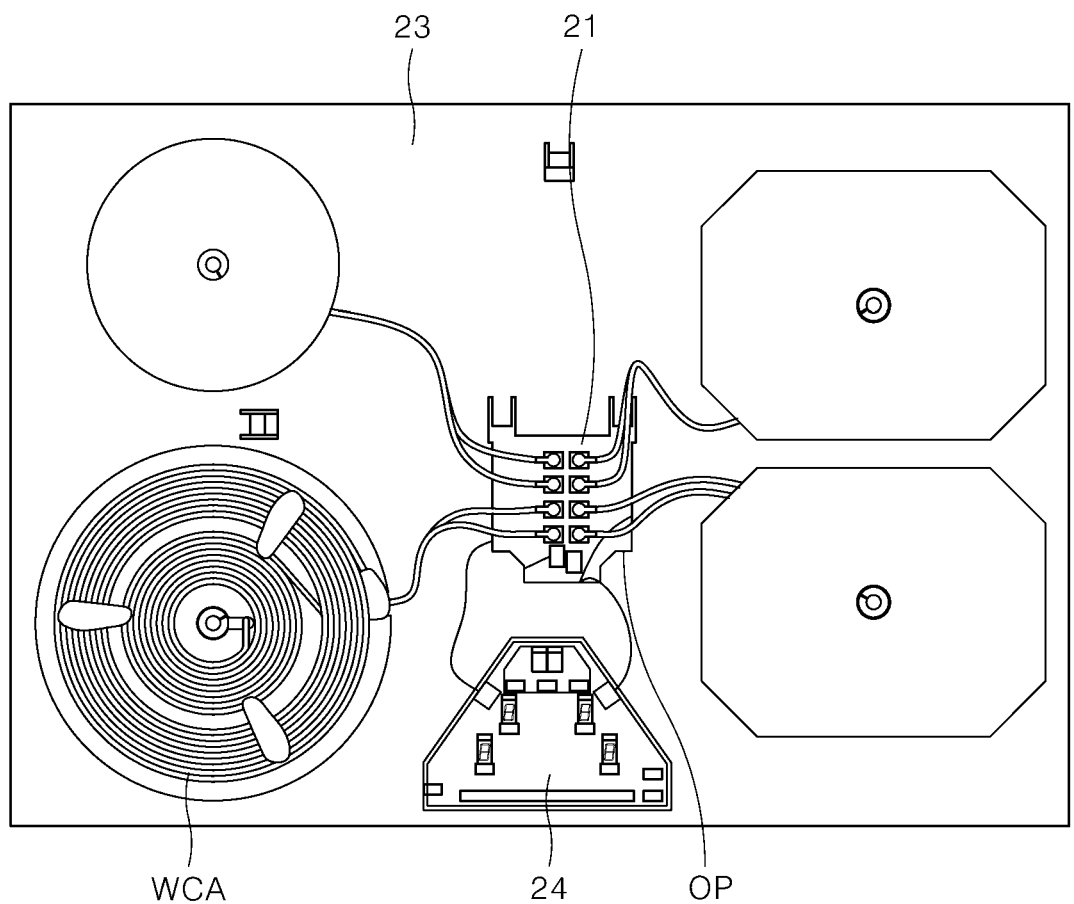

The above mentioned objects, features, and advantages of the present disclosure are described in detail with reference to the accompanying drawings, so that those skilled in the art to which the present disclosure pertains may easily implement the technical idea of the present disclosure. In the description of the present disclosure, when it is determined that the detailed description of the known technology related to the present disclosure may obscure the gist of the present disclosure, the detailed description thereof is omitted. Hereinafter, one or more implementations of the present disclosure are described in detail with reference to the accompanying drawings. A same reference numeral in the drawings is used to indicate same or similar components.

An induction heating device according to an implementation of the present disclosure is described below.

Figure 5:
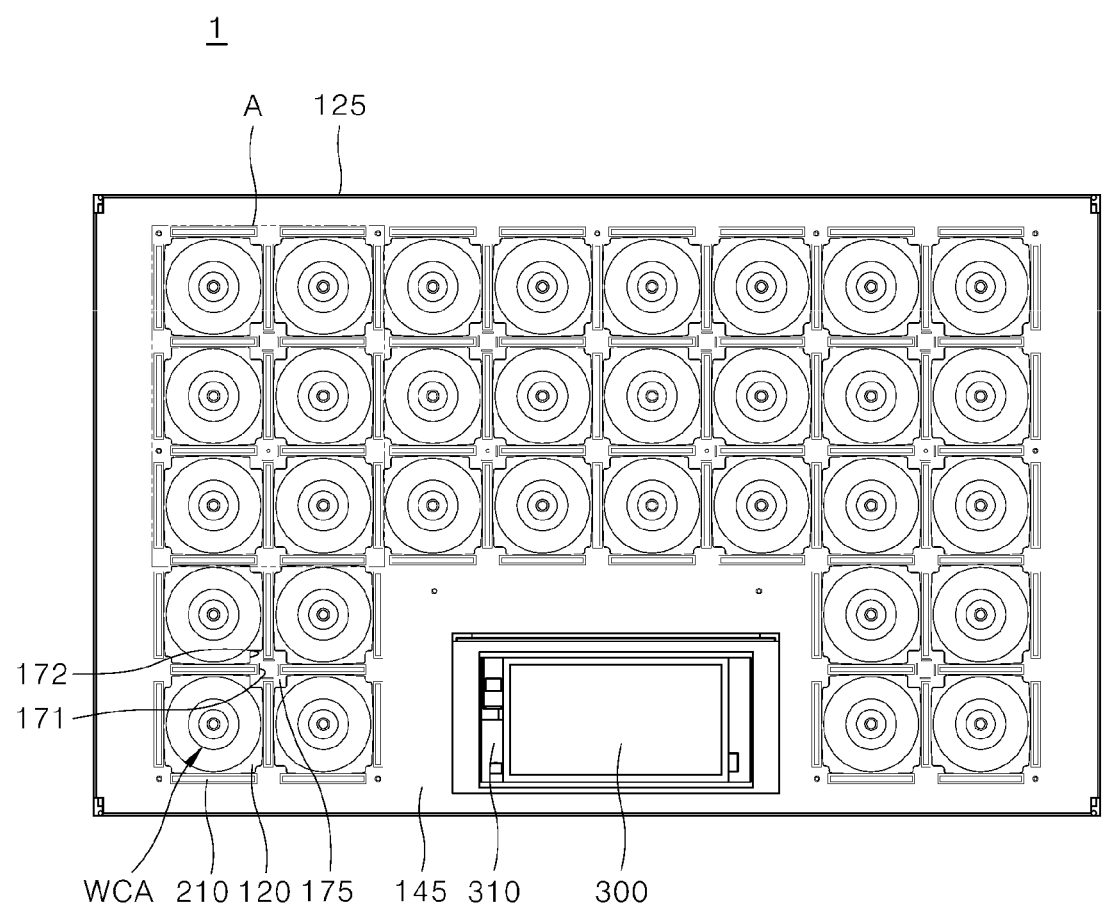
FIG. 5 is a plan view showing an example induction heating device.
Figure 6:
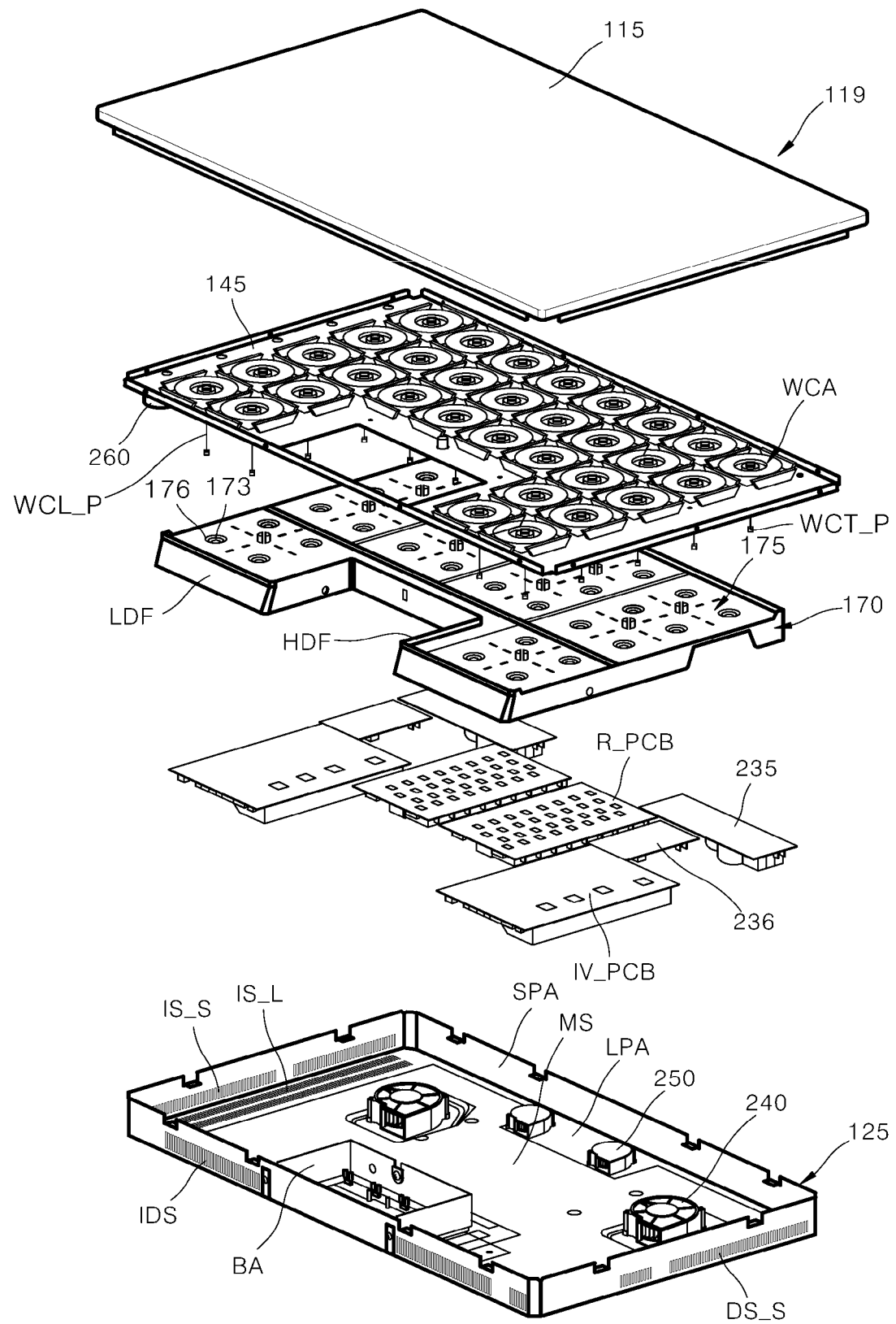
FIG. 6 is an exploded perspective view showing the induction heating device in FIG. 5.
Figure 7:
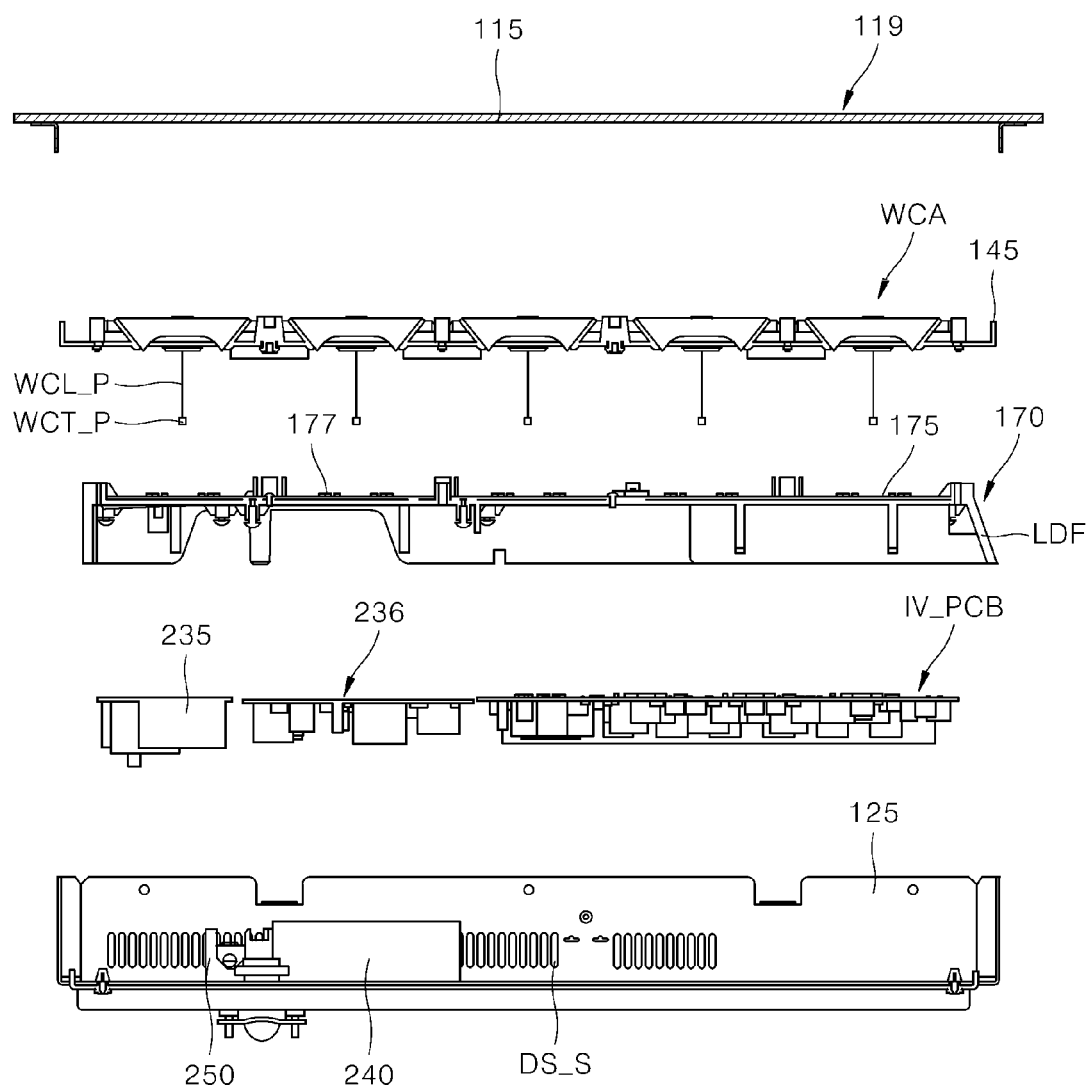
FIG. 7 is a cross-sectional view of the induction heating device in FIG. 6.
Figure 8:
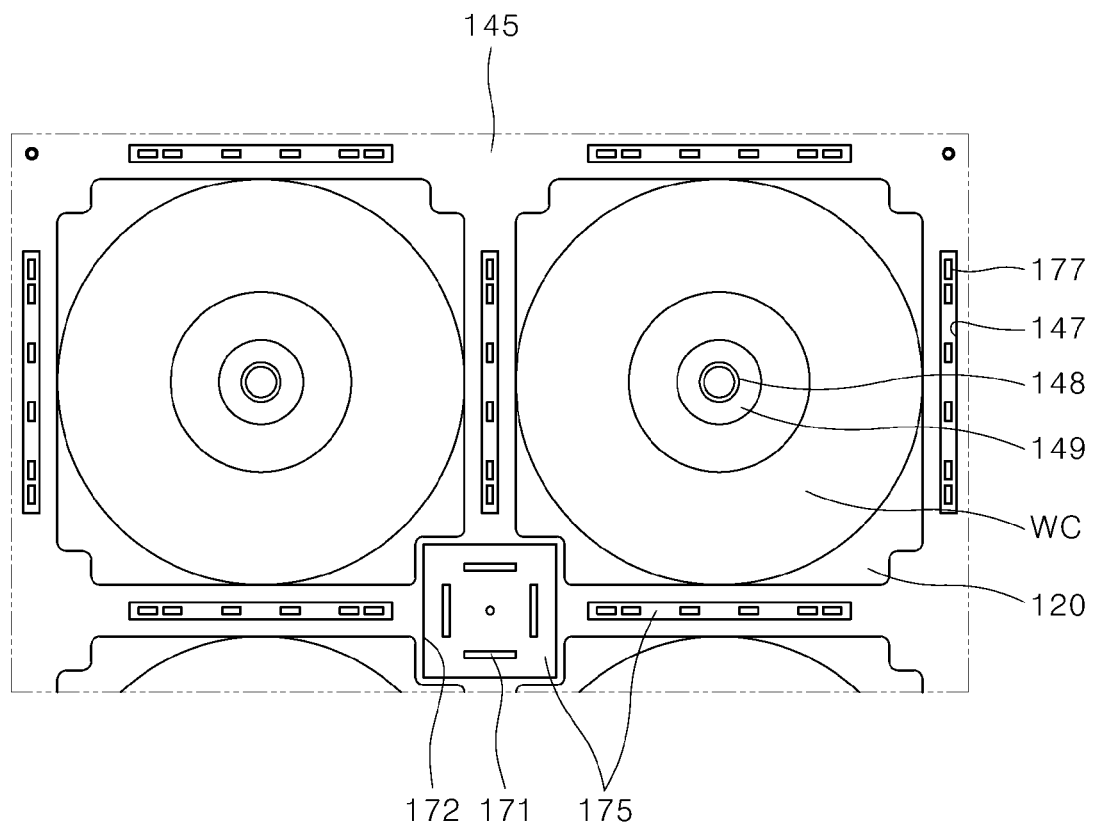
FIGS. 8 to 10 are enlarged views showing the induction heating device in FIG. 5.
Figure 9:
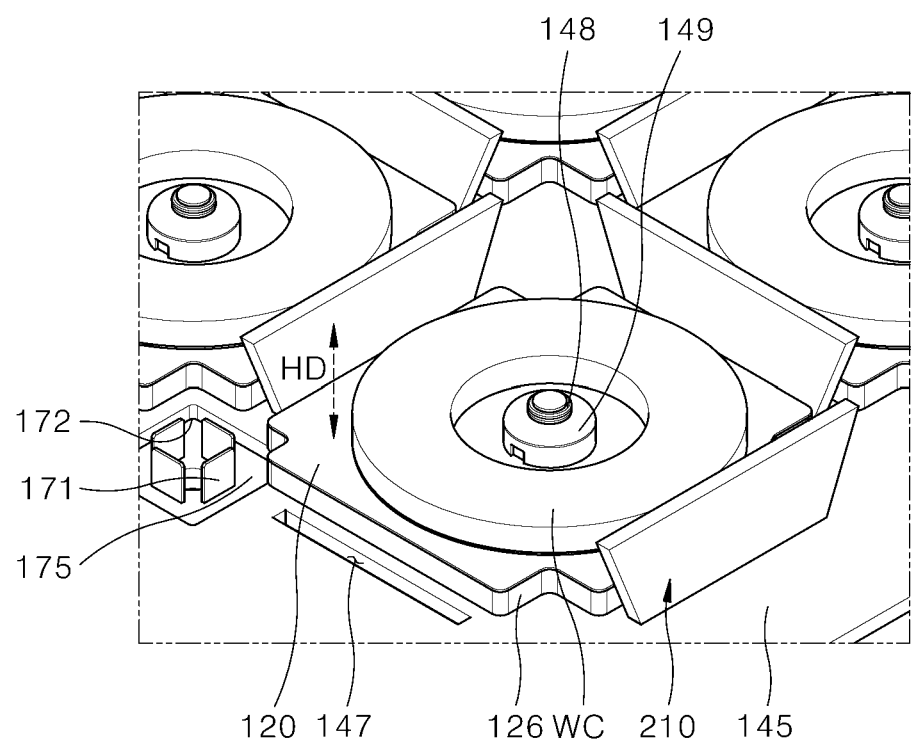
Figure 10:
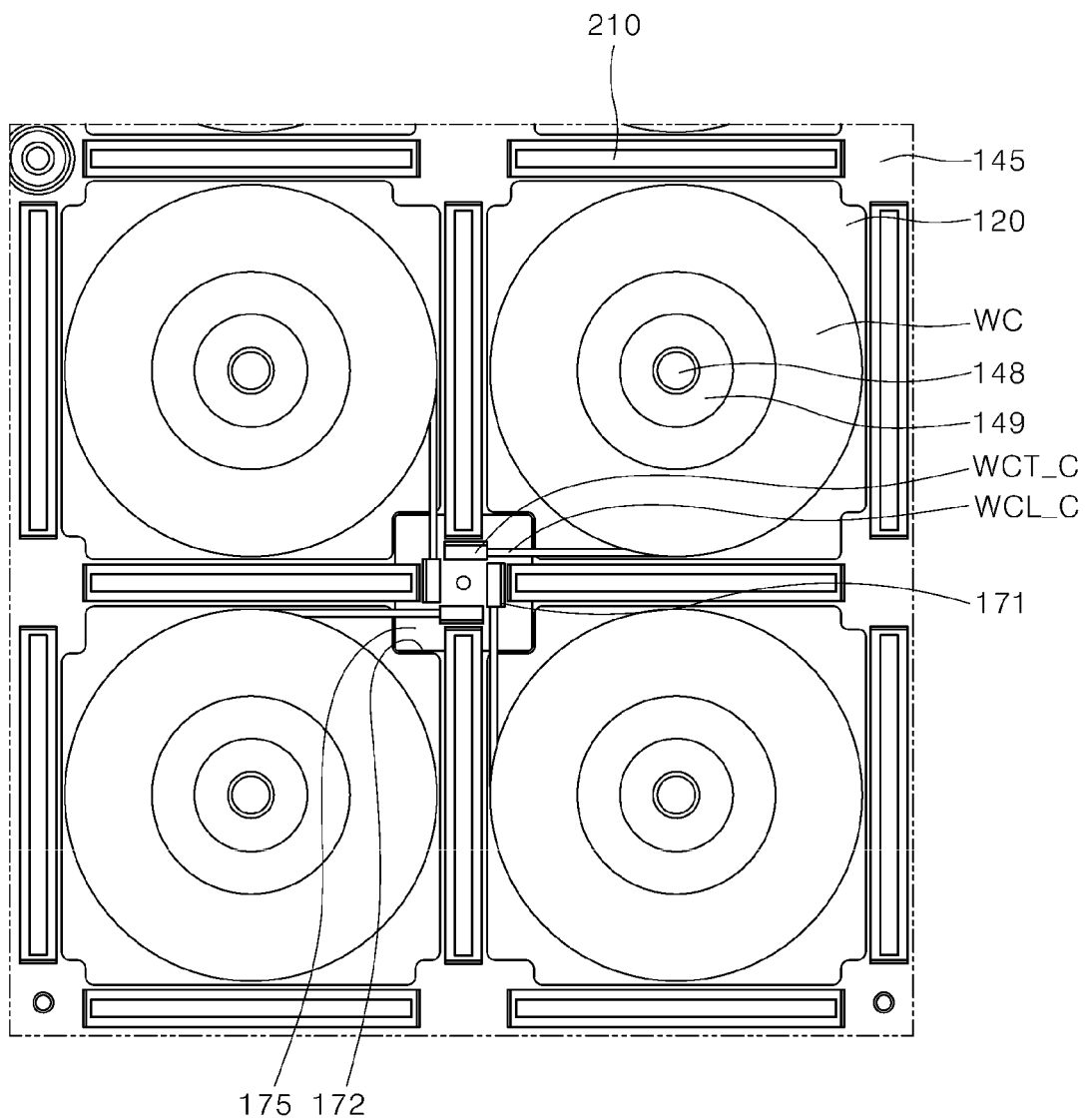

FIG. 5 is a plan view showing an example induction heating device. FIG. 6 is an exploded perspective view showing the induction heating device in FIG. 5. FIG. 7 is a cross-sectional view of components in FIG. 6. FIGS. 8 to 10 are enlarged partial views showing the induction heating device in FIG. 5.

Referring to FIGS. 5 to 10, according to an implementation of the present disclosure, an induction heating device 1 may include a case 125, a cover plate 119, a base plate 145, and an indicator substrate support 170, an indicator substrate 175, a light emitting element 177, a light guide 210, an electro-magnetic interference (EMI) filter 235, a switched mode power supply (SMPS) 236, a first blowing fan 240 to a third blowing fan 260, an input interface 300, and a controller for input interface 310, a working coil assembly WCA, a resonance substrate R_PCB, and an inverter substrate IV_PCB. A cover plate is omitted in FIGS. 5, 8, and 10, and a light guide is omitted in FIG. 8.

The case 125 may include various types of components included in the induction heating device 1, for example, a working coil assembly WCA, a base plate 145, an indicator substrate support 170, an indicator substrate 175, a light emitting element 177, a light guide 210, an EMI filter 235, a SMPS 236, a first blowing fan 240 to a third blowing fan 260, a controller for input interface 310, a resonance substrate R_PCB, and an inverter substrate IV_PCB.

In some implementations, the case 125 may include various types of devices related to the driving of the working coil WC (e.g., a power supply that provides an alternating current (AC) power (i.e., input power), a controller for an inverter substrate that controls the driving of components of the inverter substrate IV_PCB, a relay or a semiconductor switch that turns on or turns off the working coil WC, but details of various types of devices related to the driving of the working coil WC are omitted.

In some examples, the case 125 may be thermally insulated to prevent heat generated by the working coil WC from being leaking to outside.

In some examples, the case 125 may include a lower plate LPA and a side plate SPA that extends upward along an edge of the lower plate LPA.

Inlets and exhaust slits may be defined at a first area of the lower plate LPA. In some examples, inlet slits IS_S and IS_L and an additional exhaust slit DS_S, may be defined in a second area of the lower plate LPA and the side plate SPA. Details of the inlet, inlet slit, and the exhaust slit are described below in detail.

In some examples, an inlet and exhaust slit IDS may also be defined on the side plate SPA, and air may move to an inside of and to an outside of the case 125 through the inlet and exhaust slit IDS.

In some examples, a barrier BA may be disposed at a periphery of an area, on the lower plate LPA of the case 125, where the controller for the input interface 310 is disposed, and the barrier BA may extend upward from the periphery of the area where the controller for the input interface 310 is disposed.

In some examples, the barrier BA may be made of, for example, metal, and may prevent heat generated due to the driving of peripheral components from being introduced into the controller for the input interface 310 and the input interface 300.

In some examples, a silicone rubber may be inserted between an upper end of the barrier BA and a lower surface of the top plate 115.

A mica sheet MS may be provided between the lower plate LPA and the inverter substrate IV_PCB to insulate the lower plate LPA and the inverter substrate IV_PCB, of the case 125.

In some examples, a first surface of the mica sheet MS may be attached to the lower plate LPA by a sealant, and a second surface of the mica sheet MS may contact a first heat sink HS1 (see FIG. 18) provided on the inverter substrate IV_PCB.

In some examples, the first blowing fan 240 and the second blowing fan 250 may be disposed on the lower plate LPA of the case 125.

In some examples, the first blowing fan 240 may be disposed on the lower plate LPA, and may suction outside air through the inlet provided in the lower plate LPA to discharge the air to the inverter substrate IV_PCB.

In some examples, the air may be discharged from the first blowing fan 240 to the inverter substrate IV_PCB and may be guided rearward through the inverter substrate IV_PCB. The air guided rearward may be discharged below the lower plate LPA (i.e., to the outside of the case 125) through the exhaust slit provided on the lower plate LPA.

As heat generated by the inverter substrate IV_PCB is easily discharged below the lower plate LPA, it is possible to resolve the heating of the inverter substrate IV_PCB, in particular, the inverter IV (see FIG. 18). That is, a temperature of the inverter IV (see FIG. 18) may be reduced due to the air discharged from the first blowing fan 240 to the inverter substrate IV_PCB.

In some examples, the second blowing fan 250 may be disposed on the lower plate LPA and may suction the outside air through the inlet provided in the lower plate LPA and may discharge the air to the resonance substrate R_PCB.

In some examples, the air may be discharged from the second blowing fan 250 to the resonance substrate R_PCB and may be guided rearward through the resonance substrate R_PCB. The air guided rearward may be discharged below the lower plate LPA (i.e., to the outside of the case 125) through the exhaust slit provided in the lower plate LPA.

As the heat generated by the resonance substrate R_PCB is easily discharged below the lower plate LPA, it is possible to resolve the heating of the resonance substrate R_PCB, in particular, the resonance capacitor RC (see FIG. 18). That is, the temperature of the resonance capacitor R_PCB may be reduced due to the air discharged from the second blowing fan 250 to the resonance substrate R_PCB.

The cover plate 119 may be coupled to an upper end of the case 125 (i.e., an upper end of the side plate SPA) to close an inside of the case 125, and an object may be disposed on the upper surface of the cover plate 119.

In some examples, the cover plate 119 may include a top plate 115 to place the object such as a cooking vessel, and the heat generated by the working coil WC may be transmitted to the object through the top plate 115.

The top plate 115 may be made of, for example, glass. In some examples, the input interface 300 may be flush with the top plate 115 to receive input from a user and transmits the input to the controller for input interface 310, but is not limited thereto. That is, the input interface 300 may be disposed at a position other than the top plate 115.

In some examples, the input interface 300 includes a module that inputs a heating intensity or driving time of the induction heating device 1 desired by the user, and may be variously implemented with a physical button or a touch panel. In some examples, the input interface 300 may include, for example, a power button, a lock button, a power level control button (+,−), a timer control button (+,−), a charging mode button, and the like, and may display a specific image (e.g., an image of a heating zone, an image of a heating intensity, and the like).

In some examples, the input interface 300 may transfer the input received from the user to the controller for the input interface 310, and the controller for the input interface 310 may transfer the input to the above-described controller (i.e., the controller for the inverter substrate).

In some examples, the working coil assembly WCA may include a working coil WC, a ferrite core 126, and a first mica sheet 120 (which is different from the above-mentioned mica sheet MS).

In some cases, where the induction heating device 1 is a zone-free type induction heating device, a plurality of working coil assemblies WCAs may be present as shown in FIGS. 5 to 10, and a plurality of working coil assemblies WCAs may be spaced apart from one another by a predetermined distance.

An example of one working coil assembly WCA is described below.

In some examples, the working coil WC may include a conducting wire annularly wound with a plurality of times and may generate an alternating magnetic field. In some examples, the first mica sheet 120 and the ferrite core 126 may be sequentially disposed below the working coil WC.

The ferrite core 126 may be disposed below the working coil WC, and a core hole 127 (see FIG. 11) may be defined at a central portion of the ferrite core 126 to vertically overlap with an annular inner side of the working coil WC.

In some examples, the base plate 145 may be disposed below the ferrite core 126, and the first mica sheet 120 may be disposed between the ferrite core 126 and the working coil WC.

In some examples, the ferrite core 126 may be fixed to the first mica sheet 120 by the sealant, and may function to direct upward (i.e., above) an alternating magnetic field generated by the working coil WC.

The ferrite core 126 may define a stepped portion at each corner of the ferrite core 136.

The additional mica sheet 120 may be provided between the working coil WC and the ferrite core 126 and a first sheet hole 121 (see FIG. 11) may be provided at a center of the first mica sheet 120 to correspond to the annular inner side of the working coil WC in the height direction (HD). For example, the height direction may be a vertical direction relative to a bottom surface of the case 125.

In detail, the first mica sheet 120 may be fixed to the working coil WC and the ferrite core 126 by the sealant, and heat generated by the working coil WC may be prevented from being directly transferred to the ferrite core 126.

In some implementations, the induction heating device 1 may further include a second mica sheet that is fixed to an upper end of the working coil WC by the sealant and defines a second sheet hole at a central area thereof to correspond to the annular inner side of the working coil WC in the height direction HD, but details thereof are omitted.

As shown in FIGS. 8 to 10, the working coil assembly WCA may further include a packing gasket 149 that fixes the first mica sheet 120 and the ferrite core 126 to the base plate 145 and a sensor 148 that is disposed at an upper end of the packing gasket 149 to detect temperature.

In some examples, the sensor 148 may detect the temperature of the top plate 115, the temperature of the working coil WC, operation of the working coil WC and may transmit temperature information or operation information to the controller for input interface 310 described above.

The working coil assembly WCA includes the above-described components, and details of components are described below.

The working coil assembly WCA is disposed on an upper surface of the base plate 145.

Specifically, the ferrite core 126, the first mica sheet 120, and the working coil WC are sequentially stacked on the base plate 145, and the base plate 145 may be spaced upward from the indicator substrate support 170.

In some examples, the base plate 145 may be integrated, for example, and may be made of aluminum (A), but is not limited thereto.

In some examples, the indicator substrate 175 may be disposed on the upper surface of the indicator substrate support 170 and may be spaced downward from the base plate 145. Accordingly, an air flow path described below may be provided between the base plate 145 and the indicator substrate 175. Details thereof are described below.

In some examples, as shown in FIGS. 8 and 10, a connection hole 172 may be provided in the space between the ferrite cores on the base plate 145 to provide a space of the connector 171.

The connector 171 may protrude upward from the upper surface of the indicator substrate 175 to arrange wires and perform electrical connection of the working coils WCs. That is, the conducting wires WCT_C (e.g., the common terminal) of the working coils disposed around the connector 171 may be connected to the connector 171.

In some examples, the working coil WC has a common terminal WCT_C connected to (i.e., coupled to) the connector 171 and an individual terminal WCT_P connected to the resonance substrate R_PCB described below (i.e., the resonance capacitor RC (see FIG. 18)). The common terminal WCT_C may be located at positions with other terminals of the surrounding working coils. In some examples, the common terminal WCT_C and the individual terminal WCT_P may be connected to a conducting wire WCL_C (a conducting wire connected to the common terminal) or WCL_P (a conducting wire connected to the individual terminal) of the working coil WC.

The common terminal WCT_C of the working coil WC is indirectly connected to the inverter substrate IV_PCB (i.e., the inverter IV (see FIG. 18)) through the connector 171, and the individual terminal WCT_P of the working coil WC is directly connected to the resonance substrate R_PCB (i.e., the resonance capacitor RC (see FIG. 18)), and details thereof are described below.

The third blowing fan 260 may be disposed on the lower surface of the base plate 145 and may draw air from the outside of the case (e.g., outside cool air) through the inlet slits IS_L and IS_S defined in the lower plate LPA and the side plate SPA of the case 125, and may discharge the air into the air flow path defined between the base plate 145 and the indicator substrate 175.

In some examples, as shown in FIG. 6, an upper fence HDF is provided on the upper surface of the indicator substrate support 170 and the upper fence HDF is provided along an edge of the upper surface of the indicator substrate support 170. The air flow path may be surrounded by the lower surface of the base plate 145, the upper surface of the indicator substrate 175, and the upper fence HDF.

In some examples, the base plate 145 may be integrated, and the air flow path may be surrounded by the lower surface of the base plate 145, the upper surface of the indicator substrate 175, and the upper fence HDF. The air may be discharged from the third blowing fan 260 to the air flow path and may be discharged to the outside of the case 125 through the additional exhaust slits DS_S. The air may be discharged by the third blowing fan 260 and may move along the air flow path, to reduce the temperature of the working coil WC and the temperature of the indicator (in particular, a plurality of light emitting elements 177).

That is, as the cool air is circulated along the air flow path, the temperature of the working coil WC and the temperature of the indicator (in particular, the plurality of light emitting elements 177) may be reduced. In some examples, the heating of the working coil WC and the indicator (in particular, the plurality of light emitting elements 177) generated due to radiation and a convection current may be resolved.

The light guide 210 may be disposed on the base plate 145.

In some examples, the light guide 210 may be disposed on the base plate 145 around the working coil WC. That is, four light guides 210 per one working coil WC may be disposed around the working coil WC (i.e., light guides are arranged on four surfaces of the outer portion of the working coil).

The light guide 210 may include a light emitting surface (i.e., an upper surface) to indicate whether the working coil WC is driven and output intensity of the working coil WC.

As shown in FIGS. 8 and 9, a light guide installation hole 147 to install the light guide 210 may be defined in the space between the ferrite cores, in the base plate 145. That is, the light guide installation hole 147 may be defined in the base plate 145 at the position in which the light guide 210 is disposed. Accordingly, the light guide installation hole 147 may also be defined around the working coil WC, and four light guide installation holes 147 per one working coil WC may be defined around the working coil WC.

The light guide installation hole 147 may not overlap with a connection hole 172, and the number of the light guide installation holes 147 may be the same as the number of the light guides 210.

In some examples, light emitted by the light emitting element 177 disposed on the indicator substrate 175 may be transmitted to the light guide 210 through the light guide installation hole 147, and the light guide 210 may display the light emitted by the light emitting element 177 through the light emitting surface (i.e., the upper surface) provided at the upper end thereof.

The indicator substrate 175 may be disposed on the upper surface of the indicator substrate support 170 and may be spaced downward from the base plate 145, and a plurality of light emitting elements 177 may be disposed on the upper surface of the indicator substrate 175.

The plurality of light emitting elements 177 may be, for example, light emitting diodes (LEDs), and the plurality of light emitting elements 177 may be symmetrical with respect to a center of the lower surface of the light guide 210, but are not limited thereto.

In some examples, the indicator substrate 175 may have, for example, a form of a printed circuit board (i.e., PCB), and may drive a plurality of light emitting elements 177 based on the control signal received from the above-mentioned controller for the inverter substrate or the controller for the input interface 310. In some examples, various types of components may further be disposed on the indicator substrate 175 to drive the plurality of light emitting elements 177.

In some examples, the indicator substrate 175 may define the substrate hole 176 at a position corresponding to the plate hole 146 (see FIG. 11) in the height direction (HD) and the individual terminal WCT_P of the working coil WC may be connected to the resonance substrate R_PCB through the substrate hole 176 and details thereof are omitted.

The indicator substrate support 170 may be coupled to the case 125 (i.e., the lower plate LPA) and may be disposed below the working coil WC.

In some examples, the above-described upper fence HDF may be provided on the upper surface of the indicator substrate support 170, and a lower fence LDF may be provided on the lower surface of the indicator substrate support 170.

That is, the upper fence HDF of the indicator substrate support 170 supports the lower surface of the base plate 145, and the lower fence LDF of the indicator substrate support 170 may be supported by the lower plate LPA.

In some examples, a support hole 173 may be defined at a portion of the indicator substrate support 170 that corresponds to the substrate hole 176 in the height direction HD, and the individual terminal WCT_P of the working coil WC may be connected to the resonance substrate R_PCB through the support hole 173 and details thereof are described below.

In some examples, the indicator substrate 175 may be disposed on the upper surface of the indicator substrate support 170 and the EMI filter 235, the SMPS 236, the resonance substrate R_PCB, and the inverter substrate IV_PCB may be disposed on the lower surface of the indicator substrate support 170.

The EMI filter 235 may be inverted and disposed on the lower surface of the indicator substrate support 170 and may receive the AC power from the above-described power supply. In some examples, the EMI filter 235 may reduce noise of the received AC power (i.e., electro-magnetic interference (EMI)) and provide the SMPS 236 with the AC power with reduced noise.

The EMI filter 235 may be disposed at a front end of the SMPS 236.

The SMPS 236 may be inverted and disposed on the lower surface of the indicator substrate support 170, and may receive, from the EMI filter 235, the AC power with reduced noise. In some examples, the SMPS 236 may rectify the received AC power into DC power and may provide the inverter substrate IV_PCB with the rectified DC power.

In some examples, the SMPS 236 may be disposed at a first side of the resonance substrate R_PCB.

Figure 18:
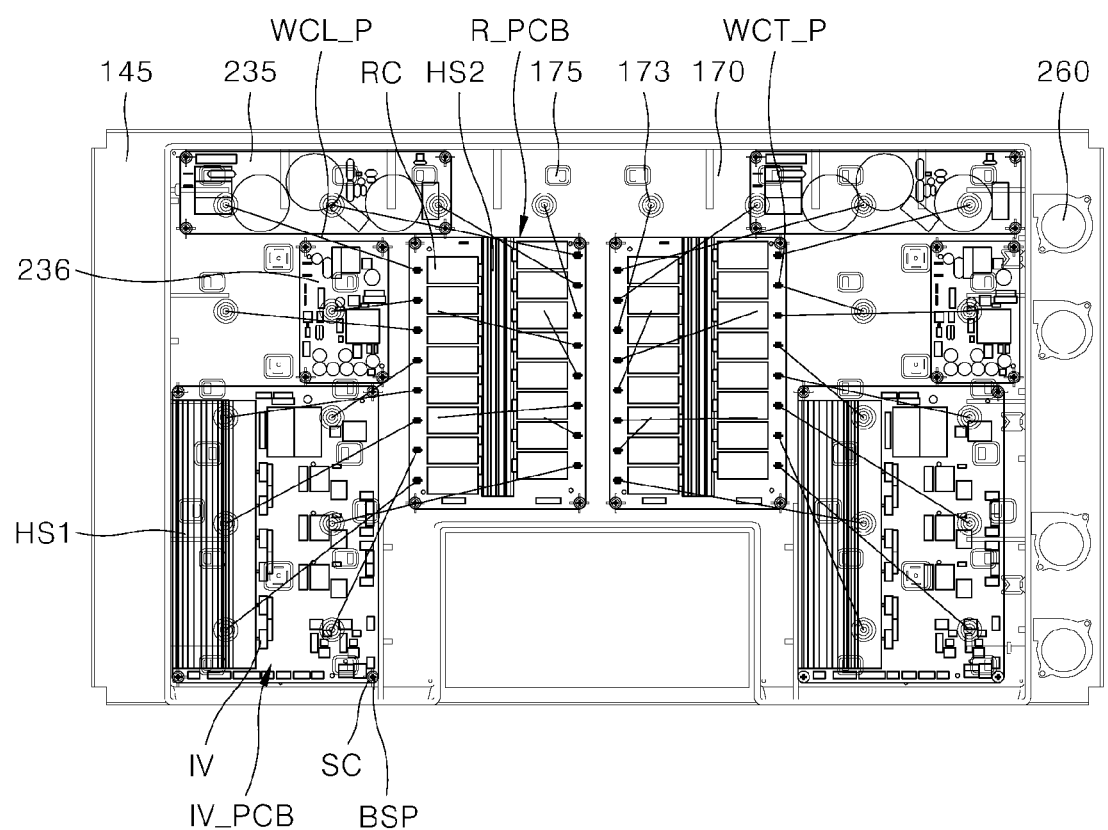
FIG. 18 shows an example of paths to connect individual terminals of a working coil after the components in FIG. 7 are assembled.

The inverter substrate IV_PCB may be inverted and disposed on the lower surface of the indicator substrate support 170 and may include the inverter IV (see FIG. 18) that applies the resonance current to the working coil WC through the switching operation and a heat sink HS1 (see FIG. 18) that radiates heat of the inverter IV (see FIG. 18).

The inverter IV (see FIG. 18) may receive the DC power from the SMPS 236 and may apply a resonance current to the working coil WC by performing a switching operation based on the received DC power.

In some examples, a plurality of inverters IVs (see FIG. 18) may be provided, and the switching of the inverter IV (see FIG. 18) may be controlled by the controller for the inverter substrate described above.

The inverter IV (see FIG. 18) may include two switching elements, and the two switching elements may be alternately turned on and off based on a switching signal received from the controller for the inverter substrate. In some examples, high frequency AC (i.e., resonance current) may be generated through the switching of the two switching elements, and the generated high frequency AC may be applied to the working coil WC.

In some examples, the inverter substrate IV_PCB may be disposed at a rear end of the SMPS 236.

The resonance substrate R_PCB may be inverted and disposed on the lower surface of the indicator substrate support 170, and may include a resonance capacitor RC (see FIG. 18) connected to the working coil WC to resonate by the switching of the inverter IV (see FIG. 18) and a heat sink HS2 (see FIG. 18) that radiates the heat of the resonance capacitor RC (see FIG. 18).

The resonance capacitor RC (see FIG. 18) resonates, when a resonance current is applied to the working coil WC by the switching operation of the inverter IV (see FIG. 18). In some examples, when the resonance capacitor RC (see FIG. 18) resonates, an amount of a current flowing through the working coil WC connected to the resonance capacitor RC (see FIG. 18) increases. That is, an eddy current may be induced into the object disposed above the working coil WC connected to the resonance capacitor RC (see FIG. 18) through this process. The inverter IV may be or include an electric circuit, an electric device, or a semiconductor device.

In some implementations, a plurality of resonance capacitors RCs (see FIG. 18) may be provided.

For example, the resonance substrate R_PCB may be disposed at a central area of the lower surface of the indicator substrate support 170.

In some implementations, the induction heating device 1 may also perform a function for transmitting wireless power based on the above-mentioned configuration and feature.

That is, power is wirelessly supplied and is applied to a plurality of electronic devices. Electronic devices that use a technology for transmitting wireless power are charged by simply placing the electronic devices on a charging pad without connecting the electronic device to an additional charge connector. The electronic devices that transmit the wireless power may not require a wired cord or a charger, thereby improving portability of electronic devices and reducing a size and a weight of electronic devices.

The technology for transmitting the wireless power may use an electromagnetic induction method using a coil, a resonance method using resonance, and a radio wave radiation method in which electrical energy is converted into a microwave and the converted microwave is transmitted. The electromagnetic induction method uses electromagnetic induction between a primary coil (e.g., a working coil WC) provided in a device that transmits wireless power and a secondary coil provided in a device that receives wireless power to transmit the power.

The induction heating method of the induction heating device 1 substantially has the same principle as the technology for transmitting the wireless power using electromagnetic induction in that the object is heated by electromagnetic induction.

In some implementations, the induction heating device 1 may perform a function for transmitting the wireless power, as well as performing a function of induction heating. In some examples, an induction heating mode or a wireless power transmission mode may be controlled by the controller for the input substrate (or the controller for the input interface 310). Thus, the function for inductively heating the object or the function for transmitting the wireless power may be selectively performed as necessary.

As described above, the induction heating device 1 according to the implementation of the present disclosure includes the above-described configuration and features. The working coil assembly WCA shown in FIG. 5 is described below in more detail.

Figure 11:
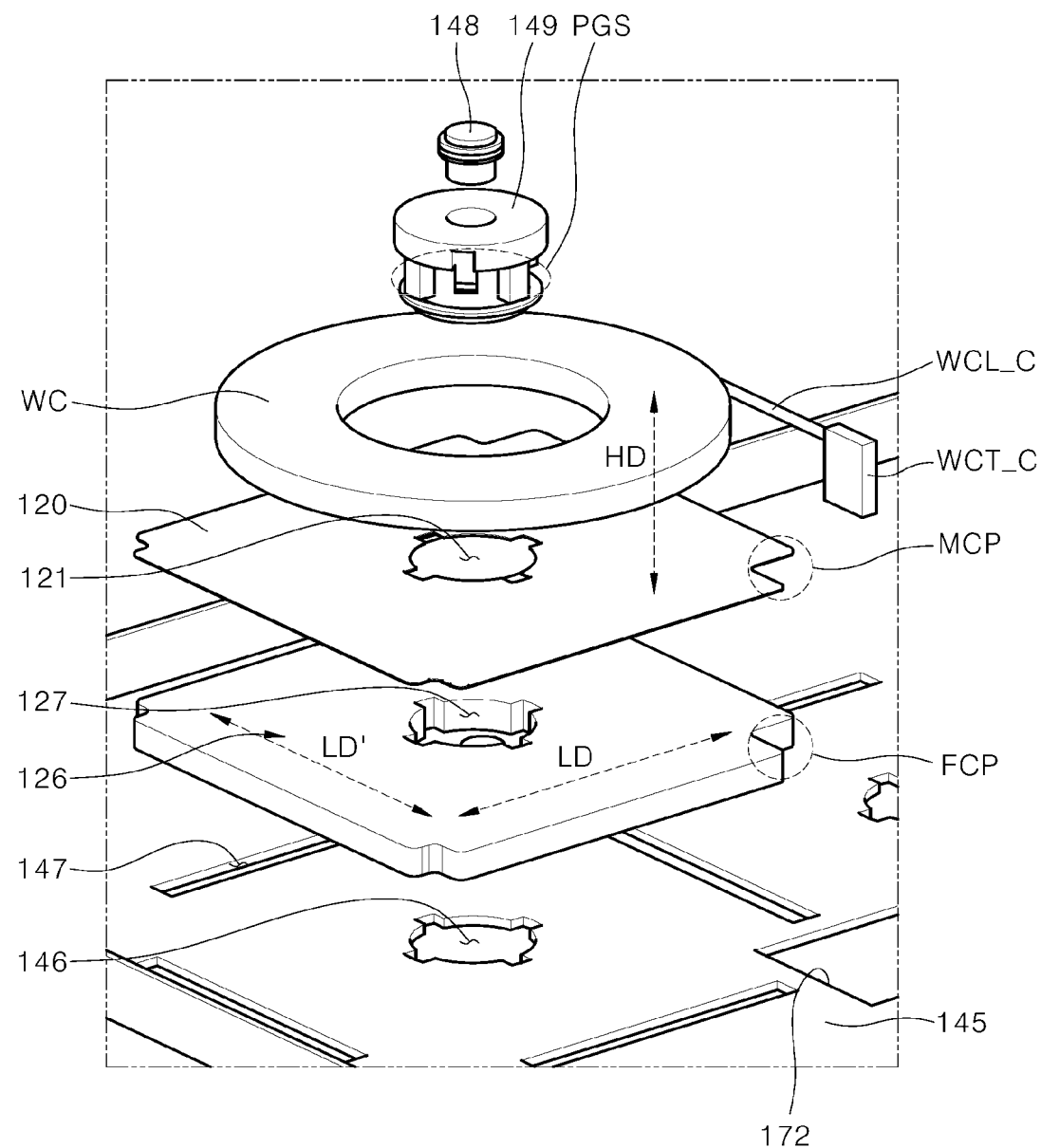
FIGS. 11 and 12 show an example of a working coil assembly in FIG. 5.
Figure 12:
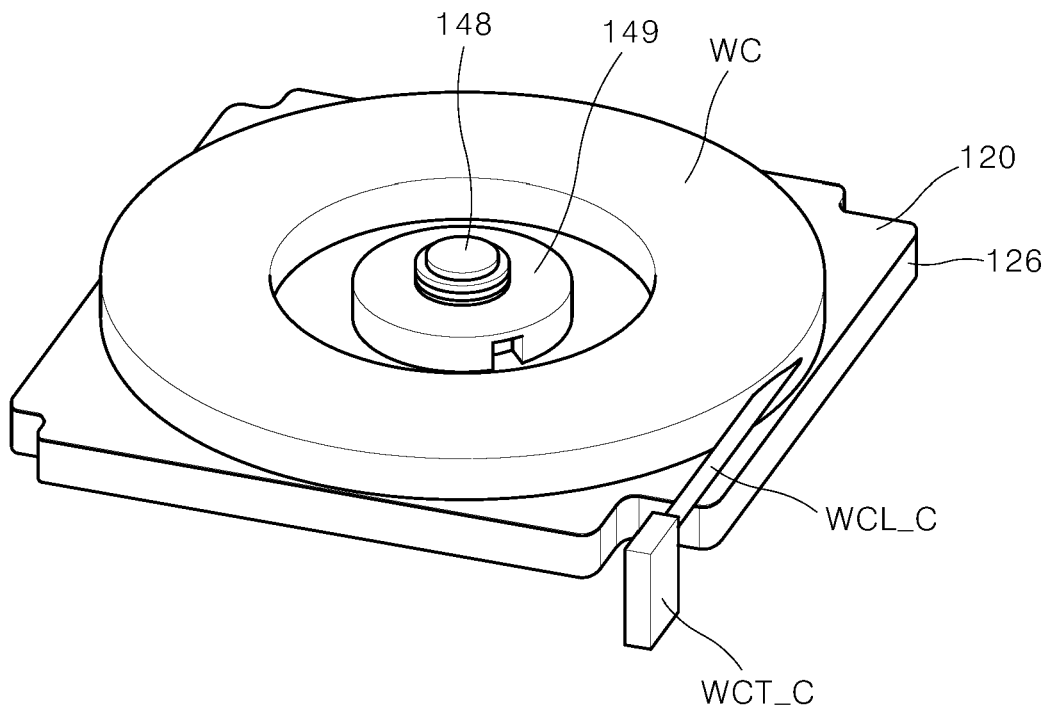

FIGS. 11 and 12 show the working coil assembly in FIG. 5.

In some examples, a schematic description of the working coil assembly WCA (see FIG. 5) is already described above, and matters of the working coil assembly WCA are described below, which are not described above.

With reference to FIGS. 11 and 12, the working coil assembly WCA (see FIG. 5) may include a working coil WC, a ferrite core 126, a first mica sheet 120, and a second mica sheet, a packing gasket 149, and a sensor 148.

In some examples, the ferrite core 126 defines a core hole 127 at a center area of the ferrite core 126 that corresponds to an annular inner side of the working coil WC in the height direction HD, the first mica sheet 120 defines a first sheet hole 121 at a center area of the first mica sheet 120 that corresponds to the annular inner side of the working coil WC in the height direction (HD), and the base plate 145 defines a plate hole 146 at a position corresponding to the annular inner side of the working coil WC in the height direction (HD).

In some examples, as shown in FIG. 11, the shapes of the core hole 127, the first sheet hole 121, and the plate hole 146 may be identical to one another. In some examples, the core hole 127, the first sheet hole 121, and the plate hole 146 are arranged along the height direction (HD). For instance, the core hole 127, the first sheet hole 121, and the plate hole 146 may be coaxial with a center of the working coil WC.

An outer circumferential surface PGS of the packing gasket 149 may be inserted into the first sheet hole 121, the core hole 127, and the plate hole 146 and has a cross-sectional shape corresponding to a shape of the first sheet hole 121.

Accordingly, the packing gasket 149 may fix the first mica sheet 120 and the ferrite core 126 to the base plate 145.

In some examples, a plurality of plate holes 146 may be defined in the base plate 145 so that a number of plate holes 146 correspond to a number of working coil assemblies.

In some implementations, four corners FCPs of the ferrite core 126 may be curved or bent stepwise, and four corners MCPs of the first mica sheet 120 may also be curved or bent stepwise. The four corners FCPs of the ferrite core 126 may correspond to four corners MCPs of the first mica sheet 120.

Accordingly, a space for the connection hole 172 provided in the base plate 145 may be provided. Shapes of the ferrite core 126 and the connection hole 172 are described below in detail with reference to FIG. 13.

Figure 13:
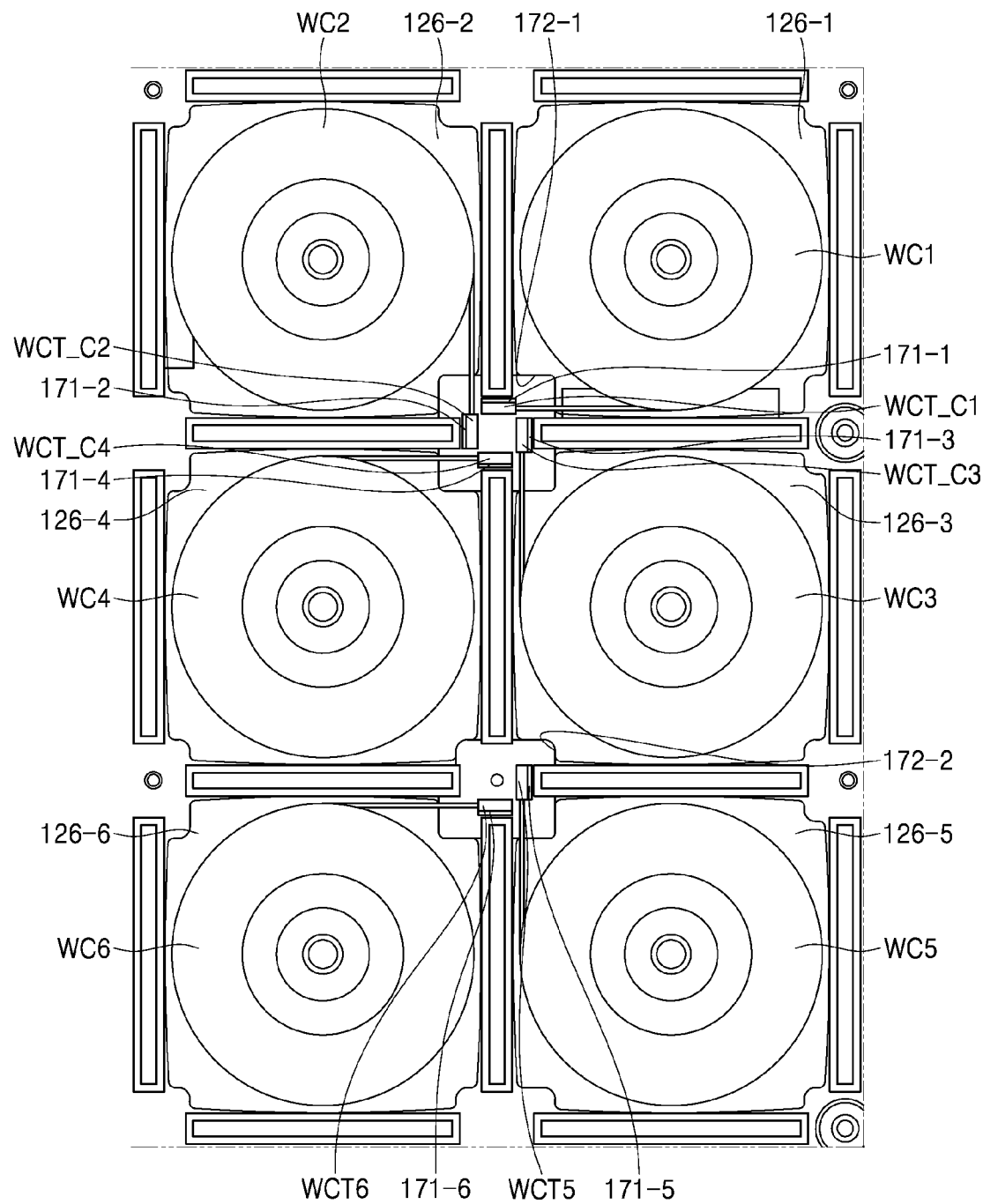
FIG. 13 is an enlarged plan view showing area "A" in FIG. 5.

FIG. 13 is an enlarged plan view showing area "A" in FIG. 5.

In some examples, in FIG. 13, a first mica sheet 120 is omitted. In some examples, the shape of the ferrite core and the shape of the connection hole described below may be equally applied to other areas other than area "A", and the shape of the ferrite core and the shape of the connection hole placed in the area "A" are described.

Referring to FIG. 13, a total of six working coils may be provided in the area "A" in FIG. 5, and six ferrite cores may be placed below six working coils, respectively. In some examples, as described above, the ferrite core may define a stepped portion at each corner of the ferrite core and the connection hole provided on the base plate may have a shape corresponding to a shape of a corner of the ferrite core.

In some examples, the working coil may include a first working coil WC1, a second working coil WC2, a third working coil WC3, a fourth working coil WC4, a fifth working coil WC5, and a sixth working coil WC6. The second working coil WC2 may be placed at a first side of the first working coil WC1. The third working coil WC may be disposed at a rear side of the first working coil WC1. The fourth working coil WC4 may be placed at an oblique position of the first working coil WC1, and may be disposed at a rear side of the second working coil WC2 and at a first side of the third working coil WC3. The fifth working coil WC5 may be placed at a rear side of the third working coil WC3 and at an oblique position of the fourth working coil WC4. The sixth working coil WC6 may be placed at an oblique position of the third working coil WC3, and disposed at a rear side of the fourth working coil WC4 and at a first side of the firth working coil WC5.

In some examples, the ferrite core may include a first ferrite core 126-1 to a sixth ferrite core 126-6 disposed below the first working coil WC1 to the sixth working coil WC6, respectively.

The connection hole may include a first connection hole 172-1 and a second connection hole 172-2. The first connection hole 172-1 has a rectangular shape and is provided between the first ferrite core 126-1 to the fourth ferrite core 126-4, and the second connection hole 172-2 has a rectangular shape in which a portion of corners thereof is bent stepwise and is provided between the third ferrite core 126-3 to the sixth ferrite core 126-6.

For example, the corner provided at a first side of the rear side of the first ferrite core 126-1 may be bent inward to correspond to the corner provided at a second side of the front side of the first connection hole 172-1 and the corner provided at a second side of the rear side of the second ferrite core 126-2 may be bent inward to correspond to the corner provided at a first side of the front side of the first connection hole 172-1. In some examples, the corner provided at a first side of the front side of the third ferrite core 126-3 may be bent inward to correspond to the corner provided at a second side of the rear side of the first connection hole 172-1, and the corner provided at a second side of the front side of the fourth ferrite core 126-4 may be bent inward to correspond to the corner provided at a first side of the rear side of the first connection hole 172-1.

The corner provided at a first side of the rear side of the third ferrite core 126-3 may be bent inward to correspond to the corner provided at a second side of the front side of the second connection hole 172-2 and the corner provided at the other side of the rear side of the fourth ferrite core 126-4 may be bent inward to correspond to the corner provided at a first side of the front side of the second connection hole 172-2. In some examples, the corner provided at a first side of the front side of the fifth ferrite core 126-5 may be bent inward to correspond to the corner provided at a second side of the rear side of the second connection hole 172-2 and the corner provided at a second side of the front side of the sixth ferrite core 126-6 may be bent inward to correspond to the corner provided at a first side of the rear side of the second connection hole 172-2.

In some examples, the connector may include a first connector 171-1 to a fourth connector 171-4 spaced apart inward from an edge of the first connection hole 172-1 and a fifth connector 171-5 and a sixth connector 171-6 spaced apart inward from an edge of the second connection hole 172-2.

As shown in FIG. 13, the first connector 171-1 may be parallel to the fourth connector 171-4 and the second connector 171-2 may be parallel to the third connector 171-3. The first connector 171-1 and the fourth connector 171-4 may be placed at a position corresponding to a direction orthogonal to the second connector 171-2 and the third connector 171-3.

In some examples, the first connector 171-1 may be provided at a first side of the rear side of the first working coil WC and may be coupled to the common terminal WCT_C1 of the first working coil WC1, and the second connector 171-2 may be provided at a second side of the rear side of the second working coil WC2 and may be coupled to the common terminal WCT_C2 of the second working coil WC2. In some examples, the third connector 171-3 may be provided at a first side of the front side of the third working coil WC3 and may be coupled to the common terminal WCT_C3 of the third working coil WC3, and the fourth connector 171-4 may be provided at a second side of the front side of the fourth working coil WC4 and may be coupled to the common terminal WCT_C4 of the fourth working coil WC4. The fifth connector 171-5 may be provided at a first side of the front side of the fifth working coil WC5 and may be coupled to the common terminal WCT_C5 of the fifth working coil WC5 and the sixth connector 171-6 may be provided at a second side of the front side of the sixth working coil WC6 and may be coupled to the common terminal WCT_C6 of the sixth working coil WC6.

The common terminal of the working coil may be coupled to only one connector. Accordingly, the common terminals WCT_C1 to WCT_C4 of the first working coil WC1 to the fourth working coil WC4 are coupled to the first connector 171-1 to the fourth connector 171-4 provided inside of the first connection hole 172-1, respectively, and the common terminals WCT_C5 and WCT_C6 of the fifth working coil WC5 and the sixth working coil WC6 are coupled to the fifth connector 171-5 and the sixth connector 171-6 provided inside of the second connection hole 172-2, respectively. The common terminals WCT_C1 to WCT_C6 coupled to the first connector 171-1 to the sixth connector 171-6, respectively, may not contact the ferrite cores 126-1 to 126-6, through the above-mentioned coupling method.

In some examples, two connectors 171-5 and 171-6 may be provided inside of the second connection hole 172-2 and an available space of the second connection hole 172-2 is greater than an available space of the first connection hole 172-1.

Therefore, the available space of the second connection hole 172-2 may be used to expand the size of the ferrite core.

That is, when the ferrite core has a greater size (i.e., an area), an amount of magnetic flux leaking below the working coil is reduced, so that high output may be obtained based on a less amount of current. In some examples, when a large-sized ferrite core is used, loss of conduction of the inverter and the heating of the working coil may be reduced by reducing the magnitude of the resonance current.

In some examples, the corner provided at a first side of the front side of the second connection hole 172-2 may be bent or curved stepwise (i.e., may be bent inward) and an area (i.e., a size) of the corner provided at a second end of the rear side of the fourth ferrite core 126-4 may be greater than an area of each of other corners of the ferrite core.

In some examples, the high output may be obtained based on a less amount of current by increasing the corner of the fourth ferrite core 126-4 and loss of the conduction of the inverter and the heating of the working coil may be reduced.

In some examples, other corners of the second connection hole 172-2 rather than the corner of the second connection hole 172-2 or the corner of the first connection hole 172-1 may be bent stepwise based on the position of the common terminal of the working coil. In this case, an area of the corner of any one of the ferrite cores, other than the fourth ferrite core 126-4 may be increased.

In some implementations, the corner provided at a first side of the front side of the second connection hole 172-2 may be bent stepwise and the corner provided at a second side of the rear side of the fourth ferrite core 126-4 may be bent.

In some implementations, as shown in FIG. 13, the area of the corner irrelevant to the connection hole, among corners of the ferrite core, may be greater than the area of the corner corresponding to the connection hole, so that the large-sized ferrite core may be provided.

The common terminal of the working coil is connected to the connector as well as avoiding contact with the ferrite core. A method of assembling components shown in FIG. 7 is described with reference to FIGS. 14 to 18.

Figure 14:
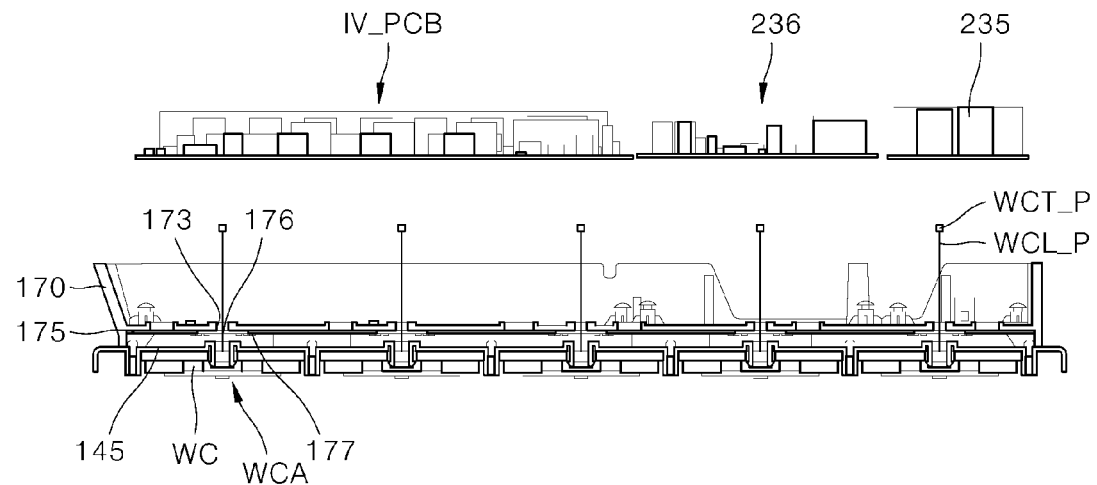
FIGS. 14 and 15 show a method of assembling example components in FIG. 7.
Figure 15:
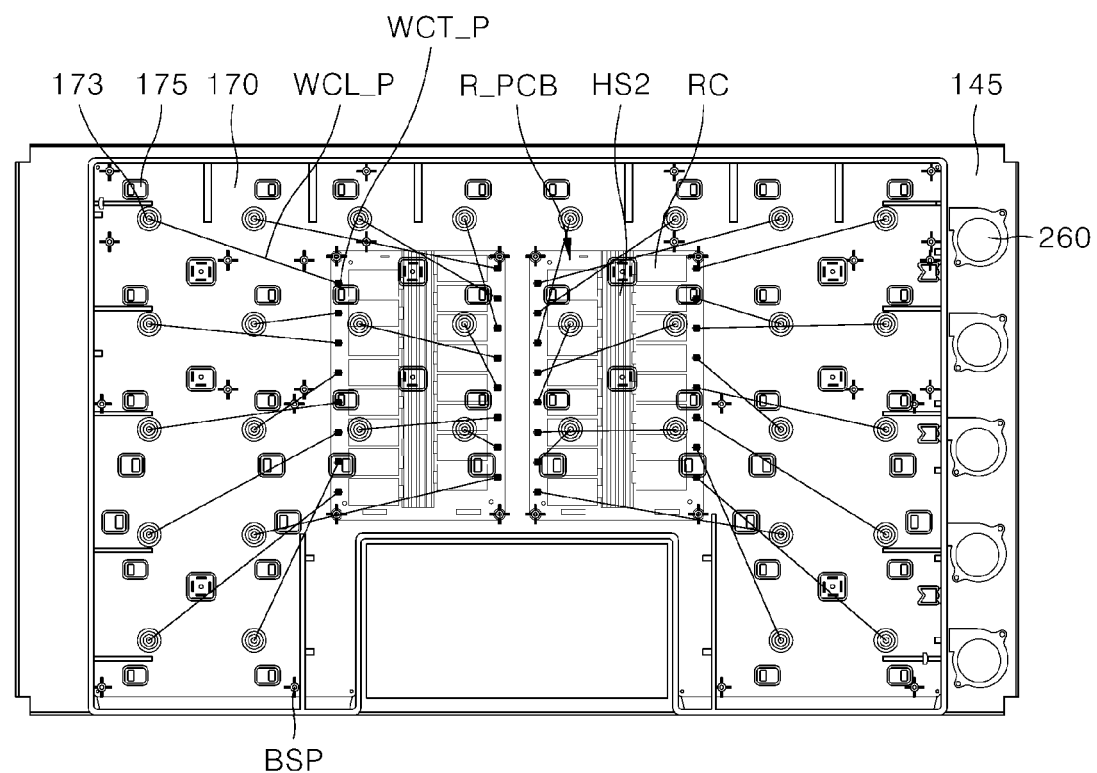
Figure 16:
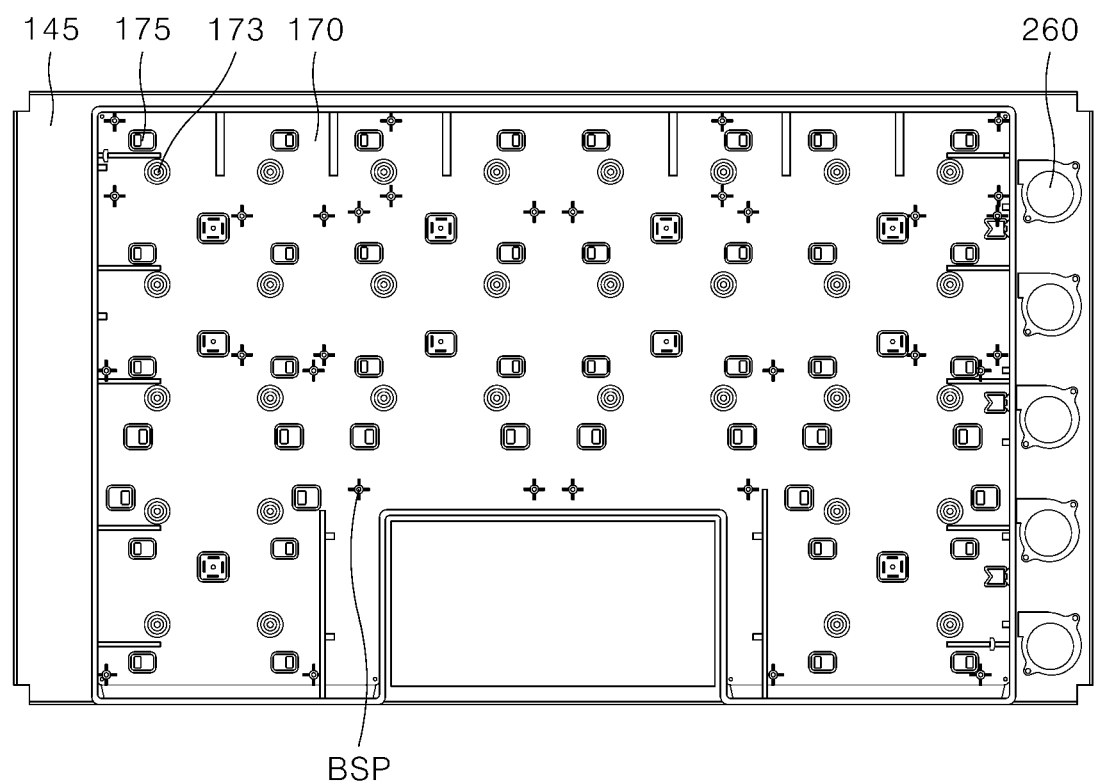
FIGS. 16 and 17 show examples of a boss in FIG. 15.
Figure 17:
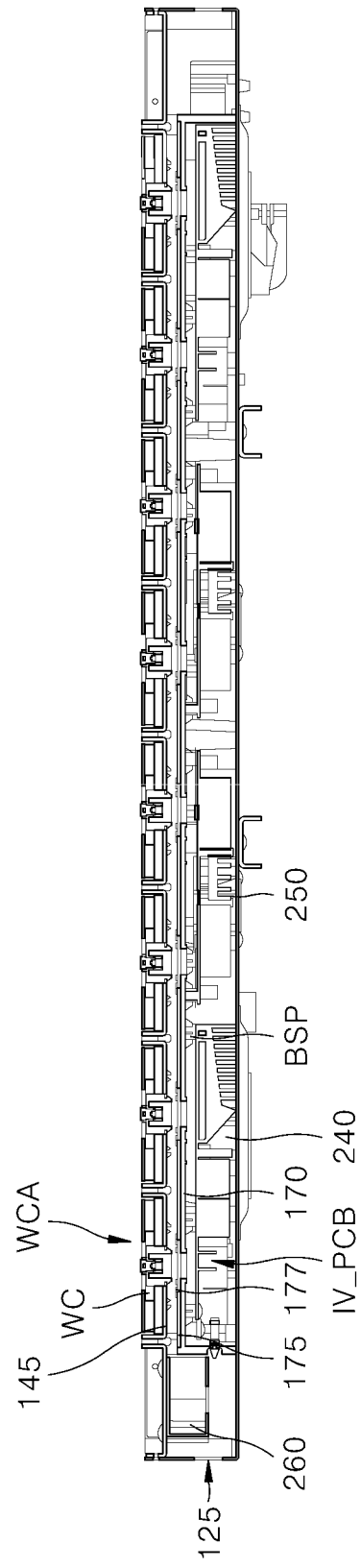

FIGS. 14 and 15 show a method of assembling components in FIG. 7. FIGS. 16 and 17 show the boss in FIG. 15. FIG. 18 shows paths to connect individual terminals of a working coil when assembly between the components in FIG. 7 is completed.

FIGS. 14 and 15 show an example method of assembling, by an operator, an induction heating device 1.

In some examples, the operator disposes the plurality of working coil assemblies WCAs on the upper surface of the base plate 145.

Subsequently, the operator seats the indicator substrate support 170 that supports the indicator substrate 175 on the upper surface of the indicator substrate support 170 at a lower end of the base plate 145 on which the plurality of working coil assemblies WCAs are disposed, and the base plate 145 and the indicator substrate support 170 are fixedly coupled by a plurality of screws.

In this case, the operator may fix the base plate 145 to the indicator substrate support 170 so that individual terminal WCT_P and a conducting wire WCL_P of each of a plurality of working coils WCs pass through the plate hole 146 (see FIG. 11), the substrate hole 176, and a support hole 173.

The operator may connect, to the connector 171 (see FIG. 9), the common terminal WCT_C (see FIG. 10) and the conducting wire WCL_C (see FIG. 10) of each of the plurality of working coils WCs.

As shown in FIG. 14, in some cases, where the base plate 145 and the indicator substrate support 170 are fixed, the operator inverts the base plate 145 toward bottom, and then various types of substrates (e.g., the EMI filter 235, the SMPS 236, the inverter substrate IV_PCB, and the resonance substrate R_PCB) are disposed on the lower surface of the indicator substrate support 170 in an inverted manner.

In some examples, the operator connects, to the resonance substrate R_PCB, the individual terminal WCT_P of each of the plurality of working coils WCs protruding through the support hole 173, and subsequently, each substrate. (e.g., the EMI filter 235, the SMPS 236, the inverter substrate IV_PCB, the resonance substrate R_PCB, and the like) are disposed on the lower surface of the indicator substrate support 170 in an inverted manner.

For example, the inverter substrate IV_PCB may have an upper surface that faces the lower surface of the indicator substrate support 170, and a lower surface that faces a bottom surface of the case 125 and that supports the inverter IV. The resonance substrate R_PCB may have an upper surface that faces the lower surface of the indicator substrate support 170, and a lower surface that faces the bottom surface of the case 125 and that supports the resonance capacitor RC. The inverter IV, the resonance capacitor RC, the EMI filter 235, and the SMPS 236 may face the bottom surface of the case 125 and protrude in a direction away from the lower surface of the indicator substrate support 170.

In some examples, as shown in FIG. 15, each individual terminal WCT_P of each of the plurality of working coils WCs may be connected to the resonance capacitor provided at an optimal position determined based on a distance between the plurality of resonance capacitors RCs and the plurality of support holes 173 and positions of the plurality of resonance capacitors RCs and the plurality of support holes 173. In some implementations, each of the individual terminals of the working coils may be connected to one of resonance capacitors.

With reference to FIGS. 16 and 17, a boss BSP may be provided on the lower surface of the indicator substrate support 170 and may protrude downward.

In some examples, a plurality of bosses BSP may be provided, and may function to provide separation distance between the indicator substrate support 170 and each of various types of substrates disposed on the lower surface of the indicator substrate support 170 and a moving passage of the individual terminal WCT_P and the conducting wire WCL_P of the working coil WC.

Accordingly, as shown in FIG. 18, the lower surface of the inverter substrate IV_PCB, the resonance substrate R_PCB, the EMI filter 235 and the SMPS 236 are coupled to a plurality of bosses BSPs. The individual terminal WCT_P of each of the plurality of working coils WCs may be connected to the resonance capacitor RC through a space between the lower surface of at least one of the inverter substrate IV_PCB, the resonance substrate R_PCB, the EMI filter 235, and the SMPS 236 and the lower surface of the indicator substrate support 170.

In some implementations, the plurality of bosses BSPs may be coupled to substrates (e.g., the inverter substrate IV_PCB, the resonance substrate R_PCB, the EMI filter 235, and the SMPS 236) by screws SCs.

In some examples, when substrates are disposed, the operator may couple the resonance substrate R_PCB to the boss provided at the center of the lower surface of the indicator substrate support 170 using a screw.

In some examples, when the resonance substrate R_PCB is disposed, and subsequently, the operator may connect the individual terminals WCT_Ps of each of the plurality of working coils WCs to the plurality of resonance capacitors RCs.

In some examples, when the connection between the individual terminal and the resonance capacitor is completed, and subsequently, the operator may couple the remaining substrates (e.g., the inverter substrate IV_PCB, the EMI filter 235, the SMPS 236) to the boss provided on the lower surface of the indicator substrate support 170.

As a result, individual terminals WCT_Ps and conducting wires WCL_Ps of each of the plurality of working coils WCs are connected through the space between the various types of substrates and the indicator substrate support 170.

In some cases, where the installation of the substrate is completed, the operator may invert again the indicator substrate support 170 and the base plate 145 fixedly coupled to each other and then may fixedly couple the indicator substrate support 170 and base plate 145, which are inverted again, to the case 125 by a plurality of screws.

Through this process, the induction heating device 1 according to an implementation of the present disclosure may be assembled.

In some implementations, the induction heating device 1 may reduce the assembly burden of the operator and simplify the manufacturing process through the improvement in the assemblability.

In some implementations, the induction heating device 1 may prevent components (e.g., the working coil or the light emitting element) from being damaged by heat generation through improving cooling performance. In some examples, the durability may be improved and repair costs may be reduced by preventing damage of components.

While the present disclosure has been described with reference to exemplary drawings thereof, it is to be understood that the present disclosure is not limited to implementations and drawings in the present disclosure, and various changes can be made by the skilled person in the art within the scope of the technical idea of the present disclosure. Although working effects obtained based on configurations of the present disclosure are not explicitly described while describing the implementations of the present disclosure, effects predictable based on the configurations have also to be recognized.

Other implementations are within the scope of the following claims.

What is claimed is:
1. An induction heating device, comprising:
a case;
a working coil disposed inside the case, the working coil comprising a conducting wire annularly wound;
a base plate disposed vertically below the working coil, the base plate having an upper surface supporting the working coil;
an indicator substrate support coupled to the case and disposed vertically below the base plate;
an indicator substrate disposed on an upper surface of the indicator substrate support, disposed vertically below the base plate, and spaced apart from the base plate, the indicator substrate comprising a light emitting element disposed on the indicator substrate;
an inverter substrate disposed at a lower surface of the indicator substrate support, the inverter substrate comprising an inverter configured to apply a resonance current to the working coil through a switching operation;
a resonance substrate disposed at the lower surface of the indicator substrate support and connected to the working coil, the resonance substrate comprising a resonance capacitor electrically connected to the working coil and the inverter;
a first heat sink disposed at the inverter substrate and configured to dissipate heat generated by the inverter; and
a second heat sink disposed at the resonance substrate and configured to dissipate heat generated by the resonance capacitor,
wherein an air flow path is defined between the base plate and the indicator substrate,
wherein the base plate defines a plate hole at a position corresponding to an annular inner side of the working coil,
wherein the indicator substrate defines a substrate hole at a position corresponding to the plate hole,
wherein the indicator substrate support defines a support hole at a position corresponding to the substrate hole,
wherein the plate hole, the substrate hole, and the support hole are arranged along a height direction of the case, and wherein the working coil comprises an individual terminal connected to the resonance capacitor through the plate hole, the substrate hole, and the support hole.

2. The induction heating device of claim 1, wherein the indicator substrate comprises a connector protruding upward from an upper surface of the indicator substrate, and
wherein the indicator substrate support comprises a boss protruding downward from the lower surface of the indicator substrate support.

3. The induction heating device of claim 2, wherein the connector is connected to the inverter, and
wherein the working coil further comprises a common terminal connected to the connector.

4. The induction heating device of claim 3, further comprising:
an electro-magnetic interference (EMI) filter disposed at the lower surface of the indicator substrate support, configured to receive alternating current (AC) power, and configured to reduce noise of the AC power; and
a switched mode power supply (SMPS) disposed at the lower surface of the indicator substrate support, configured to receive the AC power through the EMI filter, and configured to rectify the AC power to direct current (DC) power to provide the DC power to the inverter substrate,
wherein the boss is coupled to at least one of a lower surface of the inverter substrate, a lower surface of the resonance substrate, a lower surface of the EMI filter, or a lower surface of the SMPS, and
wherein the individual terminal of the working coil is connected to the resonance capacitor through a space defined between the lower surface of the indicator substrate support and the at least one of the lower surface of the inverter substrate, the lower surface of the resonance substrate, the lower surface of the EMI filter, or the lower surface of the SMPS.

5. The induction heating device of claim 4, wherein the inverter, the resonance capacitor, the EMI filter, and the SMPS face a bottom surface of the case and protrude in a direction away from the lower surface of the indicator substrate support.

6. The induction heating device of claim 3, further comprising:
an electro-magnetic interference (EMI) filter disposed at the lower surface of the indicator substrate support, configured to receive AC power, and configured to reduce noise of the AC power; and
a switched mode power supply (SMPS) disposed at the lower surface of the indicator substrate support, configured to receive the AC power through the EMI filter, and configured to rectify the AC power to direct current (DC) power to provide the DC power to the inverter substrate,
wherein the resonance substrate is disposed at a central area of the lower surface of the indicator substrate support,
wherein the SMPS is disposed at a first side of the resonance substrate,
wherein the EMI filter is disposed at a front end of the SMPS, and
wherein the inverter substrate is disposed at a rear end of the SMPS.

7. The induction heating device of claim 2, wherein the plate hole, the substrate hole, and the support hole are coaxial with a center of the working coil.

8. The induction heating device of claim 1, wherein the indicator substrate support is coupled to a lower surface of the base plate.

9. The induction heating device of claim 1, further comprising:
a ferrite core disposed vertically below the working coil and configured to direct upward an alternating magnetic field generated by the working coil;
a first mica sheet disposed between the working coil and the ferrite core and configured to block heat transfer from the working coil to the ferrite core;
a packing gasket fixing the first mica sheet and the ferrite core to the base plate; and
a sensor disposed at an upper end of the packing gasket and configured to detect a temperature of the packing gasket.

10. The induction heating device of claim 9, wherein the ferrite core defines a core hole at a center area of the ferrite core corresponding to the annular inner side of the working coil,
wherein the first mica sheet defines a first sheet hole at a center area of the first mica sheet corresponding to the annular inner side of the working coil, and
wherein the core hole, the first sheet hole, and the plate hole are arranged along the height direction of the case.

11. The induction heating device of claim 10, wherein shapes of the core hole, the first sheet hole, and the plate hole are identical to one another, and
wherein the packing gasket is inserted into the first sheet hole, the core hole, and the plate hole, and
wherein an outer circumferential surface of the packing gasket has a cross-section corresponding to the shape of the first sheet hole.

12. The induction heating device of claim 9, wherein the first mica sheet is fixed to the working coil and the ferrite core.

13. The induction heating device of claim 1, wherein the base plate is made of aluminum (Al).

14. The induction heating device of claim 1, wherein the inverter substrate has:
an upper surface facing the lower surface of the indicator substrate support; and
a lower surface facing a bottom surface of the case and supporting the inverter.

15. The induction heating device of claim 14, wherein the resonance substrate has:
an upper surface facing the lower surface of the indicator substrate support; and
a lower surface facing the bottom surface of the case and supporting the resonance capacitor.

16. An induction heating device, comprising:
a case;
a working coil disposed inside the case, the working coil comprising a conducting wire annularly wound;
a base plate disposed vertically below the working coil, the base plate having an upper surface supporting the working coil;
an indicator substrate support coupled to the case and disposed vertically below the base plate;
an indicator substrate disposed on an upper surface of the indicator substrate support, disposed vertically below the base plate, and spaced apart from the base plate;
an inverter substrate disposed at a lower surface of the indicator substrate support, the inverter substrate comprising an inverter configured to apply a resonance current to the working coil through a switching operation;

a resonance substrate disposed at the lower surface of the indicator substrate support and connected to the working coil, the resonance substrate comprising a resonance capacitor electrically connected to the working coil and the inverter;

a light guide disposed on the base plate and arranged around the working coil, the light guide configured to emit light through a surface of the light guide to thereby indicate whether the working coil is driven and an output intensity of the working coil;

a light emitting element disposed on an upper surface of the indicator substrate, disposed vertically below the light guide, and configured to emit light to the light guide; and a blowing fan disposed at a lower surface of the base plate and configured to draw air from an outside of the case and to discharge the air into an air flow path defined between the base plate and the indicator substrate.

17. The induction heating device of claim 16, wherein the indicator substrate support comprises an upper fence disposed on the upper surface of the indicator substrate support and arranged along an edge of the upper surface of the indicator substrate support, and wherein the air flow path is surrounded by the lower surface of the base plate, the upper surface of the indicator substrate, and the upper fence.

18. The induction heating device of claim 16, wherein the blowing fan is configured to decrease a temperature of the working coil and a temperature of the light emitting element by blowing the air through the air flow path.

19. An induction heating device, comprising:

a case;

a working coil disposed inside the case, the working coil comprising a conducting wire annularly wound;

a base plate disposed vertically below the working coil, the base plate having an upper surface supporting the working coil;

an indicator substrate support coupled to the case and disposed vertically below the base plate;

an indicator substrate disposed on an upper surface of the indicator substrate support, disposed vertically below the base plate, and spaced apart from the base plate;

an inverter substrate disposed at a lower surface of the indicator substrate support, the inverter substrate comprising an inverter configured to apply a resonance current to the working coil through a switching operation;

a resonance substrate disposed at the lower surface of the indicator substrate support and connected to the working coil, the resonance substrate comprising a resonance capacitor electrically connected to the working coil and the inverter;

a first heat sink disposed at the inverter substrate and configured to dissipate heat generated by the inverter; and a second heat sink disposed at the resonance substrate and configured to dissipate heat generated by the resonance capacitor.

\* \* \* \* \*